(12) United States Patent
Black et al.

(10) Patent No.: US 11,290,172 B2
(45) Date of Patent: Mar. 29, 2022

(54) NON-COHERENT COOPERATIVE MULTIPLE-INPUT MULTIPLE-OUTPUT COMMUNICATIONS

(71) Applicant: XCOM Labs, Inc., San Diego, CA (US)

(72) Inventors: Peter John Black, La Jolla, CA (US); Tamer Adel Kadous, San Diego, CA (US); Michael Mingxi Fan, San Diego, CA (US); Siddhartha Mallik, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 162 days.

(21) Appl. No.: 16/697,040

(22) Filed: Nov. 26, 2019

(65) Prior Publication Data

US 2020/0169312 A1    May 28, 2020

Related U.S. Application Data

(60) Provisional application No. 62/771,994, filed on Nov. 27, 2018.

(51) Int. Cl.
*H04B 7/08* (2006.01)
*H04W 88/08* (2009.01)
(Continued)

(52) U.S. Cl.
CPC ............ *H04B 7/088* (2013.01); *H04B 7/0413* (2013.01); *H04B 7/0617* (2013.01); *H04B 7/0695* (2013.01); *H04W 88/085* (2013.01)

(58) Field of Classification Search
CPC .... H04B 7/088; H04B 7/0413; H04B 7/0617; H04B 7/0695; H04B 7/024; H04B 7/0408;
(Continued)

(56) References Cited

U.S. PATENT DOCUMENTS 5,469,115 A    11/1995  Peterzell
5,617,060 A     4/1997  Wilson
(Continued)

OTHER PUBLICATIONS

S. Roger et al., Non-coherent MIMO Communication for the 5th Generation Mobile: Overview and Practical Aspects, Waves—2014, Dec. 31, 2014. Retrieved on Apr. 23, 2020 from: http://dacaso.webs.upv.es/data/documents/WAVES_2014.pdf.
(Continued)

*Primary Examiner* — Fred A Casca
(74) *Attorney, Agent, or Firm* — Knobbe Martens Olson & Bear LLP

(57) ABSTRACT

Aspects of this disclosure relate to an improved coordinated multipoint (CoMP) network operating in a millimeter wave frequency band in which user equipment (UEs) combine signals received across multiple spatial beams from multiple base stations. The improved CoMP network can achieve high throughput, low latency, and/or high reliability at millimeter wave frequencies while maintaining a reasonable network complexity (e.g., lower network overhead than CoMP networks implemented with coherent combining). For example, the improved CoMP network can include one or more base stations and one or more UEs. Multiple base stations can transmit the same data across multiple spatial beams to a UE at the same time. The base stations may use information provided by a UE to identify an active set of base stations and/or spatial beams to serve the UE.

23 Claims, 16 Drawing Sheets

(51) Int. Cl.
*H04B 7/0413* (2017.01)
*H04B 7/06* (2006.01)

(58) Field of Classification Search
CPC ............... H04B 7/0486; H04B 7/0626; H04B 7/0452; H04B 17/309; H04B 17/318; H04B 7/04; H04B 7/0417; H04B 7/0619; H04B 7/0404; H04B 1/1027; H04W 88/085; H04L 5/0057; H04L 5/006; H04L 25/0202; H04L 25/0248; H04L 1/1854
See application file for complete search history.

(56) References Cited

U.S. PATENT DOCUMENTS

| | | | |
|---|---|---|---|
| 5,757,858 A | 5/1998 | Black |
| 5,870,431 A | 2/1999 | Easton |
| 6,006,108 A | 12/1999 | Black |
| 6,107,878 A | 8/2000 | Black |
| 6,134,440 A | 10/2000 | Black |
| 6,147,964 A | 11/2000 | Black |
| 6,181,201 B1 | 1/2001 | Black |
| 6,205,129 B1 | 3/2001 | Esteves |
| 6,208,873 B1 | 3/2001 | Black |
| 6,246,885 B1 | 6/2001 | Black |
| 6,285,861 B1 | 9/2001 | Bonaccorso |
| 6,363,102 B1 | 3/2002 | Ling |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| 6,466,558 B1 | 10/2002 | Ling |
| 6,560,211 B2 | 5/2003 | Esteves |
| 6,574,211 B2 | 6/2003 | Padovani |
| 6,594,501 B2 | 7/2003 | Black |
| 6,633,552 B1 | 10/2003 | Ling |
| 6,636,568 B2 | 10/2003 | Kadous |
| 6,661,833 B1 | 12/2003 | Black |
| 6,678,257 B1 | 1/2004 | Vijayan |
| 6,680,925 B2 | 1/2004 | Wu |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,700,880 B2 | 3/2004 | Ling |
| 6,714,526 B2 | 3/2004 | Wei |
| 6,725,028 B2 | 4/2004 | Bonaccorso |
| 6,738,608 B2 | 5/2004 | Black |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,813,478 B2 | 11/2004 | Glazko |
| 6,873,606 B2 | 3/2005 | Agrawal |
| 6,894,994 B1 | 5/2005 | Grob |
| 6,917,821 B2 | 7/2005 | Kadous |
| 6,920,504 B2 | 7/2005 | Bender |
| 6,928,062 B2 | 8/2005 | Krishnan |
| 6,985,516 B1 | 1/2006 | Easton |
| 6,987,778 B2 | 1/2006 | Sindhushayana |
| 7,010,073 B2 | 3/2006 | Black |
| 7,012,883 B2 | 3/2006 | Jalali |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,106,782 B2 | 9/2006 | Howard |
| 7,123,922 B2 | 10/2006 | Chaponniere |
| 7,127,654 B2 | 10/2006 | Jalali |
| 7,130,282 B2 | 10/2006 | Black |
| 7,133,437 B2 | 11/2006 | Black |
| 7,145,940 B2 | 12/2006 | Gore |
| 7,149,264 B2 | 12/2006 | Black |
| 7,155,246 B2 | 12/2006 | Bhushan |
| 7,167,684 B2 | 1/2007 | Kadous |
| 7,177,351 B2 | 2/2007 | Kadous |
| 7,177,648 B2 | 2/2007 | Attar |
| 7,184,426 B2 | 2/2007 | Padovani |
| 7,184,713 B2 | 2/2007 | Kadous |
| 7,194,041 B2 | 3/2007 | Kadous |
| 7,206,580 B2 | 4/2007 | Black |
| 7,206,598 B2 | 4/2007 | Attar |
| 7,209,517 B2 | 4/2007 | Sindhushayana |
| 7,228,148 B2 | 6/2007 | Esteves |
| 7,236,535 B2 | 6/2007 | Subramaniam |
| 7,239,622 B2 | 7/2007 | Black |
| 7,239,847 B2 | 7/2007 | Attar |
| 7,251,229 B2 | 7/2007 | Montojo |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,428,269 B2 | 9/2008 | Sampath |
| 7,450,943 B2 | 11/2008 | Black |
| 7,457,639 B2 | 11/2008 | Subramaniam |
| 7,463,576 B2 | 12/2008 | Krishnan |
| 7,477,693 B2 | 1/2009 | Subramaniam |
| 7,499,427 B2 | 3/2009 | Padovani |
| 7,508,748 B2 | 3/2009 | Kadous |
| 7,525,909 B2 | 4/2009 | Fan |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,580,709 B2 | 8/2009 | Black |
| 7,596,090 B2 | 9/2009 | Black |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,693,213 B2 | 4/2010 | Sindhushayana |
| 7,719,991 B2 | 5/2010 | Bhushan |
| 7,725,799 B2 | 5/2010 | Walker |
| 7,729,714 B2 | 6/2010 | Black |
| 7,738,906 B2 | 6/2010 | Attar |
| 7,742,447 B2 | 6/2010 | Joshi |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,890,144 B2 | 2/2011 | Subramaniam |
| 7,893,873 B2 | 2/2011 | Black |
| 7,903,615 B2 | 3/2011 | Gorokhov |
| 7,924,753 B2 | 4/2011 | Attar |
| 7,940,663 B2 | 5/2011 | Kadous |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |

(56) References Cited

U.S. PATENT DOCUMENTS

| | | |
|---|---|---|
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,042,086 B2 | 10/2011 | Tseng |
| 8,050,198 B2 | 11/2011 | Bhushan |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,635 B2 | 1/2012 | Montojo |
| 8,098,767 B2 | 1/2012 | Mirbagheri |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,340,605 B2 | 12/2012 | Hou |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,379,705 B2 | 2/2013 | Mallik |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,396,152 B2 | 3/2013 | Attar |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,432,821 B2 | 4/2013 | Gorokhov |
| 8,451,740 B2 | 5/2013 | Sampath |
| 8,451,776 B2 | 5/2013 | Dayal |
| 8,452,011 B2 | 5/2013 | Guo |
| 8,457,152 B2 | 6/2013 | Gorokhov |
| 8,457,221 B2 | 6/2013 | Palanki |
| 8,462,859 B2 | 6/2013 | Sampath |
| 8,472,322 B2 | 6/2013 | Black |
| 8,483,223 B2 | 7/2013 | Black |
| 8,493,942 B2 | 7/2013 | Luo |
| 8,493,958 B2 | 7/2013 | Attar |
| 8,494,593 B2 | 7/2013 | Black |
| 8,498,192 B2 | 7/2013 | Bhushan |
| 8,498,647 B2 | 7/2013 | Gorokhov |
| 8,514,988 B2 | 8/2013 | Wu |
| 8,526,347 B2 | 9/2013 | Wang |
| 8,537,875 B2 | 9/2013 | Soriaga |
| 8,576,742 B2 | 11/2013 | Yoo |
| 8,576,760 B2 | 11/2013 | Gorokhov |
| 8,582,621 B2 | 11/2013 | Grob |
| 8,583,137 B2 | 11/2013 | Rezaiifar |
| 8,588,801 B2 | 11/2013 | Gorokhov |
| 8,594,252 B2 | 11/2013 | Black |
| 8,605,729 B2 | 12/2013 | Dayal |
| 8,605,801 B2 | 12/2013 | Rezaiifar |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,614,981 B2 | 12/2013 | Mallik |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,635,645 B2 | 1/2014 | Krishnamoorthi |
| 8,638,758 B2 | 1/2014 | Black |
| 8,639,190 B2 | 1/2014 | Gore |
| 8,654,705 B2 | 2/2014 | Wang |
| 8,654,715 B2 | 2/2014 | Wang |
| 8,655,400 B2 | 2/2014 | Kadous |
| 8,675,511 B2 | 3/2014 | Gorokhov |
| 8,675,560 B2 | 3/2014 | Yoo |
| 8,676,209 B2 | 3/2014 | Gorokhov |
| 8,700,083 B2 | 4/2014 | Yavuz |
| 8,712,461 B2 | 4/2014 | Yavuz |
| 8,724,545 B2 | 5/2014 | Dayal |
| 8,724,555 B2 | 5/2014 | Krishnan |
| 8,732,272 B2 | 5/2014 | Deshpande |
| 8,737,470 B2 | 5/2014 | Walker |
| 8,737,538 B2 | 5/2014 | Grob |
| 8,737,911 B2 | 5/2014 | Black |
| 8,743,909 B2 | 6/2014 | Black |
| 8,744,018 B2 | 6/2014 | Chen |
| 8,760,994 B2 | 6/2014 | Wang |
| 8,767,885 B2 | 7/2014 | Sampath |
| 8,773,308 B2 | 7/2014 | Black |
| 8,781,005 B2 | 7/2014 | Mallik |
| 8,787,183 B2 | 7/2014 | Mallik |
| 8,812,657 B2 | 8/2014 | Mallik |
| 8,817,924 B2 | 8/2014 | Mallik |
| 8,824,979 B2 | 9/2014 | Yavuz |
| 8,825,860 B2 | 9/2014 | Linsky |
| 8,830,934 B2 | 9/2014 | Banister |
| 8,831,156 B2 | 9/2014 | Liang |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,000 B2 | 10/2014 | Mallik |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,874,998 B2 | 10/2014 | Walker |
| 8,879,440 B2 | 11/2014 | Guo |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,891,436 B2 | 11/2014 | Zhang |
| 8,897,181 B2 | 11/2014 | Wang |
| 8,897,188 B2 | 11/2014 | Black |
| 8,897,220 B2 | 11/2014 | Kadous |
| 8,897,256 B2 | 11/2014 | Cherian |
| 8,903,021 B2 | 12/2014 | Mantravadi |
| 8,908,496 B2 | 12/2014 | Kadous |
| 8,909,279 B2 | 12/2014 | Yavuz |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,948,095 B2 | 2/2015 | Black |
| 8,948,147 B2 | 2/2015 | Zheng |
| 8,954,063 B2 | 2/2015 | Sarkar |
| 8,971,461 B2 | 3/2015 | Sampath |
| 8,971,823 B2 | 3/2015 | Gore |

(56) References Cited

U.S. PATENT DOCUMENTS

| | | |
|---|---|---|
| 8,971,884 B2 | 3/2015 | Ahluwalia |
| 8,976,662 B2 | 3/2015 | Somasundaram |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,020,009 B2 | 4/2015 | Barriac |
| 9,036,538 B2 | 5/2015 | Palanki |
| 9,055,545 B2 | 6/2015 | Black |
| 9,059,785 B2 | 6/2015 | Fertonani |
| 9,066,306 B2 | 6/2015 | Yavuz |
| 9,071,315 B2 | 6/2015 | Huang |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,106,287 B2 | 8/2015 | Wang |
| 9,107,056 B2 | 8/2015 | Damnjanovic |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,131,420 B2 | 9/2015 | Rezaiifar |
| 9,136,953 B2 | 9/2015 | Yoo |
| 9,136,974 B2 | 9/2015 | Gorokhov |
| 9,137,806 B2 | 9/2015 | Yavuz |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,198,053 B2 | 11/2015 | Edge |
| 9,204,437 B2 | 12/2015 | Smee |
| 9,210,605 B2 | 12/2015 | Yoo |
| 9,226,173 B2 | 12/2015 | Sadek |
| 9,237,434 B2 | 1/2016 | Mallik |
| 9,246,560 B2 | 1/2016 | Sampath |
| 9,253,658 B2 | 2/2016 | Sadek |
| 9,264,183 B2 | 2/2016 | Gorokhov |
| 9,264,972 B2 | 2/2016 | Fan |
| 9,265,047 B2 | 2/2016 | Mallik |
| 9,270,441 B2 | 2/2016 | Mallik |
| 9,277,564 B2 | 3/2016 | Wang |
| 9,282,462 B2 | 3/2016 | Dayal |
| 9,288,814 B2 | 3/2016 | Yavuz |
| 9,307,544 B2 | 4/2016 | Gore |
| 9,344,973 B2 | 5/2016 | Yavuz |
| 9,351,307 B2 | 5/2016 | Luo |
| 9,363,764 B2 | 6/2016 | Black |
| 9,374,791 B2 | 6/2016 | Yavuz |
| 9,398,602 B2 | 7/2016 | Kadous |
| 9,408,165 B2 | 8/2016 | Jou |
| 9,408,220 B2 | 8/2016 | Gore |
| 9,419,751 B2 | 8/2016 | Sindhushayana |
| 9,450,638 B2 | 9/2016 | Yan |
| 9,451,480 B2 | 9/2016 | Huang |
| 9,461,736 B2 | 10/2016 | Bhushan |
| 9,474,051 B2 | 10/2016 | Wilson |
| 9,474,075 B2 | 10/2016 | Yavuz |
| 9,485,069 B2 | 11/2016 | Wang |
| 9,491,722 B2 | 11/2016 | Yavuz |
| 9,497,495 B2 | 11/2016 | Krishnamoorthi |
| 9,497,765 B2 | 11/2016 | Yoo |
| 9,509,452 B2 | 11/2016 | Liang |
| 9,521,554 B2 | 12/2016 | Farajidana |
| 9,525,477 B1 | 12/2016 | Wu |
| 9,578,649 B2 | 2/2017 | Dayal |
| 9,585,150 B2 | 2/2017 | Marsh |
| 9,585,156 B2 | 2/2017 | Bhattad |
| 9,609,649 B2 | 3/2017 | Fan |
| 9,660,776 B2 | 5/2017 | Kadous |
| 9,673,837 B2 | 6/2017 | Xue |
| 9,693,323 B2 | 6/2017 | Mallik |
| 9,730,227 B2 | 8/2017 | Marsh |
| 9,750,014 B2 | 8/2017 | Sadek |
| 9,755,705 B2 | 9/2017 | Hou |
| 9,780,847 B2 | 10/2017 | Budianu |
| 9,788,361 B2 | 10/2017 | Valliappan |
| 9,813,497 B2 | 11/2017 | Mallik |
| 9,832,785 B2 | 11/2017 | Kadous |
| 9,860,033 B2 | 1/2018 | Kadous |
| 9,867,194 B2 | 1/2018 | Kadous |
| 9,877,203 B2 | 1/2018 | Yoo |
| 9,882,623 B2 | 1/2018 | Sun |
| 9,893,800 B2 | 2/2018 | Wu |
| 9,900,074 B2 | 2/2018 | Mallik |
| 9,900,856 B2 | 2/2018 | Wu |
| 9,924,368 B2 | 3/2018 | Valliappan |
| 9,929,835 B2 | 3/2018 | Dabeer |
| 9,936,400 B2 | 4/2018 | Lee |
| 9,942,801 B2 | 4/2018 | Yerramalli |
| 9,954,668 B2 | 4/2018 | Lee |
| 9,955,476 B2 | 4/2018 | Black |
| 9,961,579 B2 | 5/2018 | Geirhofer |
| 9,967,729 B2 | 5/2018 | Wang |
| 9,973,923 B2 | 5/2018 | Damnjanovic |
| 9,991,986 B2 | 6/2018 | Sindhushayana |
| 9,991,989 B2 | 6/2018 | Malladi |
| 9,992,004 B2 | 6/2018 | Mallik |
| 10,009,053 B2 | 6/2018 | Somasundaram |
| 10,020,911 B2 | 7/2018 | Mallik |
| 10,021,677 B2 | 7/2018 | Mallik |
| 10,028,332 B2 | 7/2018 | Mallik |
| 10,033,558 B2 | 7/2018 | Yoo |
| 10,034,269 B2 | 7/2018 | Sun |
| 10,044,438 B2 | 8/2018 | Kadous |
| 10,044,459 B2 | 8/2018 | Chendamarai Kannan |
| 10,075,313 B2 | 9/2018 | Black |
| 10,085,283 B2 | 9/2018 | Yoo |
| 10,091,789 B2 | 10/2018 | Valliappan |
| 10,098,140 B2 | 10/2018 | Mallik |
| 10,123,323 B2 | 11/2018 | Mallik |
| 10,136,333 B2 | 11/2018 | Yoo |
| 10,136,452 B2 | 11/2018 | Liu |
| 10,143,005 B2 | 11/2018 | Chendamarai Kannan |
| 10,149,293 B2 | 12/2018 | Damnjanovic |
| 10,149,318 B2 | 12/2018 | Sun |
| 10,178,649 B2 | 1/2019 | Liu |
| 10,182,404 B2 | 1/2019 | Prakash |
| 10,187,900 B2 | 1/2019 | Zhang |
| 10,200,904 B2 | 2/2019 | Zhang |
| 10,201,014 B2 | 2/2019 | Kadous |
| 10,206,117 B2 | 2/2019 | Damnjanovic |
| 10,218,406 B2 | 2/2019 | Liu |
| 10,219,235 B2 | 2/2019 | Patel |
| 10,219,252 B2 | 2/2019 | Chendamarai Kannan |
| 10,219,292 B2 | 2/2019 | Damnjanovic |
| 10,219,300 B2 | 2/2019 | Gorokhov |
| 10,225,818 B2 | 3/2019 | Liu |
| 10,231,131 B2 | 3/2019 | Zhang |
| 10,231,132 B2 | 3/2019 | Zhang |
| 10,244,399 B2 | 3/2019 | Damnjanovic |
| 10,250,678 B2 | 4/2019 | Mallik |
| 10,257,848 B2 | 4/2019 | Sun |
| 10,257,851 B2 | 4/2019 | Patel |
| 10,264,541 B2 | 4/2019 | Patel |
| 10,270,579 B2 | 4/2019 | Chendamarai Kannan |
| 10,278,177 B2 | 4/2019 | Sadek |
| 10,285,117 B2 | 5/2019 | Yoo |
| 10,291,379 B2 | 5/2019 | Kadous |
| 10,292,093 B2 | 5/2019 | Chendamarai Kannan |
| 10,298,289 B2 | 5/2019 | Yerramalli |

(56) References Cited

U.S. PATENT DOCUMENTS

| | | |
|---|---|---|
| 10,299,284 B2 | 5/2019 | Sadek |
| 10,312,987 B2 | 6/2019 | Mallik |
| 10,327,241 B2 | 6/2019 | Kadous |
| 10,327,261 B2 | 6/2019 | Naghshvar |
| 10,333,595 B2 | 6/2019 | Fakoorian |
| 10,333,668 B2 | 6/2019 | Yoo |
| 10,334,546 B2 | 6/2019 | Chendamarai Kannan |
| 10,341,884 B2 | 7/2019 | Sun |
| 10,349,404 B2 | 7/2019 | Chendamarai Kannan |
| 10,356,626 B2 | 7/2019 | Montojo |
| 10,356,816 B2 | 7/2019 | Valliappan |
| 10,362,574 B2 | 7/2019 | Chendamarai Kannan |
| 10,368,301 B2 | 7/2019 | Chendamarai Kannan |
| 10,368,305 B2 | 7/2019 | Radulescu |
| 10,368,348 B2 | 7/2019 | Chendamarai Kannan |
| 10,368,372 B2 | 7/2019 | Chendamarai Kannan |
| 10,374,777 B2 | 8/2019 | Kadous |
| 10,375,711 B2 | 8/2019 | Sadek |
| 10,389,479 B2 | 8/2019 | Yoo |
| 10,397,754 B2 | 8/2019 | Vajapeyam |
| 10,397,796 B2 | 8/2019 | Sun |
| 10,404,434 B2 | 9/2019 | Kannan |
| 10,404,509 B2 | 9/2019 | Sun |
| 10,405,228 B2 | 9/2019 | Liu |
| 10,405,242 B2 | 9/2019 | Kadous |
| 10,405,262 B2 | 9/2019 | Chendamarai Kannan |
| 10,405,335 B2 | 9/2019 | Barghi |
| 10,411,795 B2 | 9/2019 | Liu |
| 10,412,704 B2 | 9/2019 | Sun |
| 10,425,826 B2 | 9/2019 | Fakoorian |
| 10,425,945 B2 | 9/2019 | Sun |
| 10,433,179 B2 | 10/2019 | Zhang |
| 10,440,731 B2 | 10/2019 | Fan |
| 10,448,257 B2 | 10/2019 | Patel |
| 10,448,296 B2 | 10/2019 | Radulescu |
| 10,454,569 B2 | 10/2019 | Wu |
| 10,455,455 B2 | 10/2019 | Yoo |
| 10,455,457 B2 | 10/2019 | Sadek |
| 10,461,797 B2 | 10/2019 | Liu |
| 10,462,676 B2 | 10/2019 | Mallik |
| 10,470,048 B2 | 11/2019 | Zhang |
| 10,470,112 B2 | 11/2019 | Damnjanovic |
| 10,476,627 B2 | 11/2019 | Bhushan |
| 10,476,781 B2 | 11/2019 | Luo |
| 10,477,437 B2 | 11/2019 | Zhang |
| 10,477,526 B2 | 11/2019 | Chendamarai Kannan |
| 10,484,135 B2 | 11/2019 | Mallik |
| 10,484,212 B2 | 11/2019 | Yoo |
| 10,484,878 B2 | 11/2019 | Patel |
| 10,484,934 B2 | 11/2019 | Malik |
| 10,484,935 B2 | 11/2019 | Li |
| 10,484,954 B2 | 11/2019 | Liu |
| 10,484,959 B2 | 11/2019 | Liu |
| 10,484,992 B2 | 11/2019 | Sadek |
| 10,485,027 B2 | 11/2019 | Mallik |
| 10,492,220 B2 | 11/2019 | Sun |
| 10,499,394 B2 | 12/2019 | Damnjanovic |
| 10,506,629 B2 | 12/2019 | Sun |
| 10,511,399 B2 | 12/2019 | Sun |
| 10,511,987 B2 | 12/2019 | Liu |
| 10,516,618 B2 | 12/2019 | Barghi |
| 10,523,300 B2 | 12/2019 | Malik |
| 10,524,279 B2 | 12/2019 | Yoo |
| 10,536,195 B2 | 1/2020 | Sun |
| 10,536,944 B2 | 1/2020 | Zhang |
| 10,536,966 B2 | 1/2020 | Liu |
| 10,541,851 B2 | 1/2020 | Malik |
| 10,542,436 B2 | 1/2020 | Liu |
| 10,542,541 B2 | 1/2020 | Valliappan |
| 10,542,543 B2 | 1/2020 | Yerramalli |
| 10,542,556 B2 | 1/2020 | Mallik |
| 10,547,422 B2 | 1/2020 | Yoo |
| 10,547,494 B2 | 1/2020 | Liu |
| 10,548,020 B2 | 1/2020 | Khoshnevisan |
| 10,548,131 B2 | 1/2020 | Yerramalli |
| 10,548,153 B2 | 1/2020 | Akkarakaran |
| 10,554,539 B2 | 2/2020 | Luo |
| 10,554,540 B2 | 2/2020 | Luo |
| 10,555,203 B2 | 2/2020 | Malik |
| 10,555,220 B2 | 2/2020 | Yerramalli |
| 10,560,304 B2 | 2/2020 | Lei |
| 10,574,422 B2 | 2/2020 | Wang |
| 10,574,565 B2 | 2/2020 | Luo |
| 10,575,185 B2 | 2/2020 | Li |
| 10,575,229 B2 | 2/2020 | Wu |
| 10,581,568 B2 | 3/2020 | Mallik |
| 10,581,572 B2 | 3/2020 | Chendamarai Kannan |
| 10,581,722 B2 | 3/2020 | Luo |
| 10,582,458 B2 | 3/2020 | Sadek |
| 10,587,497 B2 | 3/2020 | Luo |
| 10,595,327 B2 | 3/2020 | Sadek |
| 10,595,342 B2 | 3/2020 | Islam |
| 10,602,543 B2 | 3/2020 | Sun |
| 10,602,545 B2 | 3/2020 | Mallik |
| 10,609,660 B2 | 3/2020 | Liu |
| 10,609,664 B2 | 3/2020 | Zhang |
| 10,616,737 B2 | 4/2020 | Liu |
| 10,616,769 B2 | 4/2020 | Damnjanovic |
| 10,616,771 B2 | 4/2020 | Montojo |
| 10,616,845 B2 | 4/2020 | Fan |
| 10,616,912 B2 | 4/2020 | Chendamarai Kannan |
| 10,623,163 B2 | 4/2020 | Sun |
| 2004/0110525 A1 | 6/2004 | Black |
| 2004/0121730 A1 | 6/2004 | Kadous |
| 2006/0119356 A1 | 6/2006 | Rabe |
| 2006/0203794 A1 | 9/2006 | Sampath |
| 2006/0229089 A1 | 10/2006 | Tokgoz |
| 2007/0041457 A1 | 2/2007 | Kadous |
| 2007/0066232 A1 | 3/2007 | Black |
| 2007/0071147 A1 | 3/2007 | Sampath |
| 2007/0165738 A1 | 7/2007 | Barriac |
| 2008/0025241 A1 | 1/2008 | Bhushan |
| 2008/0032740 A1 | 2/2008 | Joshi |
| 2008/0049791 A1 | 2/2008 | Tirkkonen et al. |
| 2008/0112495 A1 | 5/2008 | Gore |
| 2009/0080499 A1 | 3/2009 | Yavuz |
| 2009/0135754 A1 | 5/2009 | Yavuz |
| 2009/0163209 A1 | 6/2009 | Black |
| 2010/0003931 A1 | 1/2010 | Krishnan |
| 2010/0046497 A1 | 2/2010 | Jalali |
| 2010/0067422 A1 | 3/2010 | Kadous |
| 2010/0153488 A1 | 6/2010 | Mittal |
| 2010/0215022 A1 | 8/2010 | Black |
| 2011/0007680 A1 | 1/2011 | Kadous |
| 2011/0007688 A1 | 1/2011 | Veeravalli |
| 2011/0222423 A1 | 9/2011 | Spindola |
| 2011/0235515 A1 | 9/2011 | Dreyfus |
| 2011/0255434 A1 | 10/2011 | Ylitalo |
| 2011/0256834 A1 | 10/2011 | Dayal |
| 2011/0310858 A1 | 12/2011 | Tokgoz |
| 2012/0026940 A1 | 2/2012 | Barbieri |
| 2012/0077532 A1 | 3/2012 | Kadous |
| 2012/0113906 A1 | 5/2012 | Kadous |
| 2012/0127870 A1 | 5/2012 | Zhao |
| 2012/0127923 A1 | 5/2012 | Zhao |
| 2012/0140798 A1 | 6/2012 | Kadous |
| 2012/0201158 A1 | 8/2012 | Geirhofer |
| 2012/0213303 A1 | 8/2012 | Kadous |
| 2012/0314655 A1 | 12/2012 | Xue |
| 2013/0053079 A1 | 2/2013 | Kwun et al. |
| 2013/0058276 A1 | 3/2013 | Somasundaram |
| 2013/0194948 A1 | 8/2013 | Mallik |
| 2013/0201959 A1 | 8/2013 | Guo |
| 2013/0229935 A1 | 9/2013 | Gorokhov |
| 2013/0229990 A1 | 9/2013 | Fan |
| 2013/0294275 A1 | 11/2013 | Gorokhov |
| 2013/0336193 A1 | 12/2013 | Luo |
| 2013/0336249 A1 | 12/2013 | Zhao |
| 2014/0023001 A1 | 1/2014 | Huang |
| 2014/0029456 A1 | 1/2014 | Mallik |
| 2014/0029705 A1 | 1/2014 | Wu |
| 2014/0038645 A1 | 2/2014 | Wu |
| 2014/0056239 A1 | 2/2014 | Zhang |
| 2014/0071894 A1 | 3/2014 | Kairouz |

(56) References Cited

U.S. PATENT DOCUMENTS

| | | |
|---|---|---|
| 2014/0079155 A1 | 3/2014 | Wang |
| 2014/0204857 A1 | 7/2014 | Mallik |
| 2014/0219117 A1 | 8/2014 | Meshkati |
| 2014/0219243 A1 | 8/2014 | Meshkati |
| 2014/0247814 A1 | 9/2014 | Zhang |
| 2014/0269616 A1 | 9/2014 | Black |
| 2014/0273884 A1 | 9/2014 | Mantravadi |
| 2014/0285684 A1 | 9/2014 | Huang |
| 2014/0301309 A1 | 10/2014 | Luo |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0085686 A1 | 3/2015 | Chande |
| 2015/0139015 A1 | 5/2015 | Kadous |
| 2015/0163823 A1 | 6/2015 | Sadek |
| 2015/0180622 A1 | 6/2015 | Yoo |
| 2015/0223077 A1 | 8/2015 | Fan |
| 2015/0282077 A1 | 10/2015 | Yavuz |
| 2015/0319702 A1 | 11/2015 | Patel |
| 2015/0326382 A1 | 11/2015 | Li |
| 2015/0350919 A1 | 12/2015 | Patel |
| 2016/0088625 A1 | 3/2016 | Kadous |
| 2016/0088644 A1 | 3/2016 | Au et al. |
| 2016/0095039 A1 | 3/2016 | Valliappan |
| 2016/0095040 A1 | 3/2016 | Valliappan |
| 2016/0112168 A1 | 4/2016 | Yoo |
| 2016/0128130 A1 | 5/2016 | Sadek |
| 2016/0234820 A1 | 8/2016 | Mallik |
| 2016/0353482 A1 | 12/2016 | Valliappan |
| 2016/0381673 A1 | 12/2016 | Sun |
| 2017/0005741 A1 | 1/2017 | Wu |
| 2017/0019814 A1 | 1/2017 | Determan |
| 2017/0026976 A1 | 1/2017 | Yoo |
| 2017/0027017 A1 | 1/2017 | Black |
| 2017/0041766 A1 | 2/2017 | Vajapeyam |
| 2017/0142705 A1 | 5/2017 | Chendamarai Kannan |
| 2017/0163433 A1 | 6/2017 | Luo |
| 2017/0222771 A1 | 8/2017 | Chendamarai Kannan |
| 2017/0223739 A1 | 8/2017 | Mallik |
| 2017/0251473 A1 | 8/2017 | Xue |
| 2017/0311346 A1 | 10/2017 | Chendamarai Kannan |
| 2017/0318586 A1 | 11/2017 | Wang |
| 2017/0332288 A1 | 11/2017 | Sadek |
| 2017/0332338 A1 | 11/2017 | Mallik |
| 2018/0032516 A1 | 2/2018 | Mallik |
| 2018/0035463 A1 | 2/2018 | Mallik |
| 2018/0042018 A1 | 2/2018 | Bhushan |
| 2018/0054348 A1 | 2/2018 | Luo |
| 2018/0054780 A1 | 2/2018 | Radulescu |
| 2018/0054848 A1 | 2/2018 | Yoo |
| 2018/0062801 A1 | 3/2018 | Zhang |
| 2018/0070242 A1 | 3/2018 | Damnjanovic |
| 2018/0077725 A1 | 3/2018 | Sun |
| 2018/0109957 A1 | 4/2018 | Fan |
| 2018/0110056 A1 | 4/2018 | Zhang |
| 2018/0115958 A1* | 4/2018 | Raghavan ............ H04B 7/0639 |
| 2018/0115973 A1 | 4/2018 | Black |
| 2018/0124777 A1 | 5/2018 | Yerramalli |
| 2018/0124789 A1 | 5/2018 | Yerramalli |
| 2018/0131499 A1 | 5/2018 | Zhang |
| 2018/0139618 A1 | 5/2018 | Yerramalli |
| 2018/0139782 A1 | 5/2018 | Sadek |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167941 A1 | 6/2018 | Zhang |
| 2018/0176946 A1 | 6/2018 | Sun |
| 2018/0199258 A1* | 7/2018 | Cezanne ............... H04W 40/06 |
| 2018/0213486 A1 | 7/2018 | Yoo |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234830 A1 | 8/2018 | Wang |
| 2018/0241494 A1 | 8/2018 | Chendamarai Kannan |
| 2018/0242348 A1 | 8/2018 | Chendamarai Kannan |
| 2018/0249496 A1 | 8/2018 | Radulescu |
| 2018/0255584 A1 | 9/2018 | Sun |
| 2018/0279134 A1 | 9/2018 | Malik |
| 2018/0279292 A1 | 9/2018 | Luo |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310341 A1 | 10/2018 | Yerramalli |
| 2018/0324713 A1 | 11/2018 | Yoo |
| 2018/0343676 A1 | 11/2018 | Yerramalli |
| 2018/0352520 A1 | 12/2018 | Zhang |
| 2018/0352563 A1 | 12/2018 | Liu |
| 2018/0367362 A1 | 12/2018 | Sun |
| 2018/0368089 A1 | 12/2018 | Yerramalli |
| 2018/0376392 A1 | 12/2018 | Wu |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0045509 A1 | 2/2019 | Mallik |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075591 A1 | 3/2019 | Sun |
| 2019/0075597 A1 | 3/2019 | Yerramalli |
| 2019/0081768 A1 | 3/2019 | Zhang |
| 2019/0082333 A1 | 3/2019 | Malik |
| 2019/0090178 A1 | 3/2019 | Liu |
| 2019/0090256 A1 | 3/2019 | Liu |
| 2019/0090273 A1 | 3/2019 | Yoo |
| 2019/0098656 A1 | 3/2019 | Chendamarai Kannan |
| 2019/0098663 A1 | 3/2019 | Zhang |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0104547 A1 | 4/2019 | Xue |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0124518 A1 | 4/2019 | Zhang |
| 2019/0124595 A1 | 4/2019 | Lei |
| 2019/0124613 A1 | 4/2019 | Liu |
| 2019/0124663 A1 | 4/2019 | Liu |
| 2019/0124694 A1 | 4/2019 | Chendamarai Kannan |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0150088 A1 | 5/2019 | Sun |
| 2019/0150198 A1 | 5/2019 | Sun |
| 2019/0158333 A1 | 5/2019 | Zhang |
| 2019/0159280 A1 | 5/2019 | Chakraborty |
| 2019/0166621 A1 | 5/2019 | Yerramalli |

(56) References Cited

U.S. PATENT DOCUMENTS

| | | |
|---|---|---|
| 2019/0173521 A1 | 6/2019 | Liu |
| 2019/0173611 A1 | 6/2019 | Liu |
| 2019/0174532 A1 | 6/2019 | Damnjanovic |
| 2019/0174542 A1 | 6/2019 | Lei |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0199786 A1 | 6/2019 | Mallik |
| 2019/0200385 A1 | 6/2019 | Xue |
| 2019/0223215 A1 | 7/2019 | Tian |
| 2019/0229788 A1 | 7/2019 | Zhang |
| 2019/0238177 A1 | 8/2019 | Liu |
| 2019/0238219 A1 | 8/2019 | Liu |
| 2019/0238284 A1 | 8/2019 | Liu |
| 2019/0239202 A1 | 8/2019 | Bhattad |
| 2019/0246410 A1 | 8/2019 | Zhang |
| 2019/0246425 A1 | 8/2019 | Zhang |
| 2019/0253219 A1 | 8/2019 | Fan |
| 2019/0261354 A1 | 8/2019 | Fakoorian |
| 2019/0268907 A1 | 8/2019 | Bhattad |
| 2019/0268933 A1 | 8/2019 | Sun |
| 2019/0274162 A1 | 9/2019 | Zhang |
| 2019/0280836 A1 | 9/2019 | Bhattad |
| 2019/0288761 A1 | 9/2019 | Mallik |
| 2019/0305834 A1 | 10/2019 | Fakoorian |
| 2019/0305882 A1 | 10/2019 | Wang |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313260 A1 | 10/2019 | Zhang |
| 2019/0313419 A1 | 10/2019 | Fakoorian |
| 2019/0319767 A1 | 10/2019 | Sun |
| 2019/0320420 A1 | 10/2019 | Zhang |
| 2019/0320424 A1 | 10/2019 | Yerramalli |
| 2019/0320452 A1 | 10/2019 | Zhang |
| 2019/0327047 A1 | 10/2019 | Liu |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335456 A1 | 10/2019 | Yerramalli |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |
| 2019/0349969 A1 | 11/2019 | Chakraborty |
| 2019/0349992 A1 | 11/2019 | Zhang |
| 2019/0349998 A1 | 11/2019 | Bhattad |
| 2019/0357252 A1 | 11/2019 | Sun |
| 2019/0357255 A1 | 11/2019 | Sun |
| 2019/0363773 A1 | 11/2019 | Yerramalli |
| 2019/0364468 A1 | 11/2019 | Yerramalli |
| 2019/0364579 A1 | 11/2019 | Zhang |
| 2019/0373571 A1 | 12/2019 | Damnjanovic |
| 2019/0373640 A1 | 12/2019 | Sun |
| 2019/0379561 A1 | 12/2019 | Zhang |
| 2019/0380147 A1 | 12/2019 | Zhang |
| 2019/0386737 A1 | 12/2019 | Liu |
| 2019/0387532 A1 | 12/2019 | Liu |
| 2019/0394790 A1 | 12/2019 | Damnjanovic |
| 2020/0008107 A1 | 1/2020 | Zhang |
| 2020/0008108 A1 | 1/2020 | Yoo |
| 2020/0008131 A1 | 1/2020 | Chakraborty |
| 2020/0015268 A1 | 1/2020 | Zhang |
| 2020/0021423 A1 | 1/2020 | Liu |
| 2020/0022029 A1 | 1/2020 | Sadek |
| 2020/0029221 A1 | 1/2020 | Xue |
| 2020/0037336 A1 | 1/2020 | Sun |
| 2020/0045556 A1 | 2/2020 | Xue |
| 2020/0045623 A1 | 2/2020 | Damnjanovic |
| 2020/0045744 A1 | 2/2020 | Sun |
| 2020/0052870 A1 | 2/2020 | Yerramalli |
| 2020/0053599 A1 | 2/2020 | Damnjanovic |
| 2020/0053739 A1 | 2/2020 | Xue |
| 2020/0059346 A1 | 2/2020 | Yoo |
| 2020/0059854 A1 | 2/2020 | Li |
| 2020/0067627 A1 | 2/2020 | Bhushan |
| 2020/0067639 A1 | 2/2020 | Lin |
| 2020/0067748 A1 | 2/2020 | Zhang |
| 2020/0068435 A1 | 2/2020 | Zhang |
| 2020/0077394 A1 | 3/2020 | Damnjanovic |
| 2020/0077439 A1 | 3/2020 | Sun |
| 2020/0084759 A1 | 3/2020 | Liu |
| 2020/0099436 A1 | 3/2020 | Malik |
| 2020/0100116 A1 | 3/2020 | Chakraborty |
| 2020/0100247 A1 | 3/2020 | Zhang |
| 2020/0100250 A1 | 3/2020 | Zhang |
| 2020/0107335 A1 | 4/2020 | Xue |
| 2020/0107360 A1 | 4/2020 | Xue |
| 2020/0107364 A1 | 4/2020 | Xue |
| 2020/0136680 A1* | 4/2020 | Kim ..................... H04B 7/0617 |
| 2020/0403689 A1* | 12/2020 | Rofougaran ........... H04B 7/165 |

OTHER PUBLICATIONS

International Search Report dated Mar. 19, 2020 for International Application No. PCT/US2019/063350.

Written Opinion dated Mar. 19, 2020 for International Application No. PCT/US2019/063350.

Wikipedia, Cooperative MIMO, https://en.wikipedia.org/wiki/Cooperative_MIMO, Nov. 21, 2018.

Wikipedia, Single-frequency network, https://en.wikipedia.org/wiki/Single-frequency_network, Nov. 21, 2018.

Artiza Networks, LTE-A Tutorial: CoMP Techniques, http://www.artizanetworks.com/resources/tutorials/accelera_tech.html, Nov. 21, 2018.

3GPP RP-170750, New WID: Further Enhancements to Coordinated Multi-Point (CoMP) Operation for LTE, Mar. 2017.

3GPP TR 36.741, Study on Further Enhancements to Coordinated Multi-Point (CoMP) Operation for LTE, V14.0.0, Mar. 2017.

Agrawal, et al., Dynamic Point Selection for LTE—Advanced: Algorithms and Performance, Wireless Communications and Networking Conference (WCNC), 2014 IEEE, Istanbul, Turkey, Apr. 2014, pp. 1392-1397.

Andrews, et al., Are We Approaching the Fundamental Limits of Wireless Network Densification?, IEEE Communications Magazine, vol. 54, No. 10, pp. 184-190, Oct. 2016.

Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.

Buzzi, et al., Cell-Free Massive MIMO: User-Centric Approach, IEEE Wireless Communications Letters, vol. 6, No. 6, pp. 706-709, Dec. 2017.

Checko, et al., Cloud RAN for Mobile Networks—a Technology Overview, IEEE Communications Surveys & Tutorials, vol. 17, No. 1, Sep. 2014.

Chen, et al., Channel Hardening and Favorable Propagation in Cell-Free Massive MIMO with Stochastic Geometry, version 1, 2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.

Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.

Gesbert, et al., Multi-cell MIMO Cooperative Networks: A New Look at Interference, IEEE Journal on Selected Areas in Communications, vol. 28, No. 9, pp. 1380-1408, Dec. 2010.

Gilhousen, et al., On the Capacity of a Cellular CDMA system, IEEE Transactions on Vehicular Technology, vol. 40, No. 2, pp. 303-311, May 1991.

Interdonato, et al., How Much Do Downlink Pilots Improve Cell-Free Massive MIMO?, IEEE, 2016, 7 pages.

(56) References Cited

OTHER PUBLICATIONS

Larsson, et al., Massive MIMO for Next Generation Wireless Systems, Jan. 2014.

Marzetta, et al., Fundamentals of Massive MIMO, Cambridge University Press, Dec. 2016, Table of Contents.

Nayebi, et al., Precoding and Power Optimization in Cell-Free Massive MIMO Systems, IEEE Transactions on Wireless Communications, vol. 16, No. 7, pp. 4445-4459, Jul. 2017.

Ngo, et al., Cell-Free Massive MIMO Versus Small Cells, IEEE Transactions on Wireless Communications, vol. 16, No. 3, pp. 1834-1850, Mar. 2017.

Ngo, et al., On the Total Energy Efficiency of Cell-Free Massive MIMO, IEEE Transactions on Green Communications and Networking, vol. 2, No. 1, pp. 25-39, Mar. 2018.

Osseiran, et al., 5G Mobile and Wireless Communications Technology, Cambridge University Press, Oct. 2016, Ch. 9, Coordinated multi-point transmission in 5G.

Rohde & Schwarz, LTE Transmission Modes and Beamforming, White Paper, Jul. 2015.

Shamai, et al., Enhancing the Cellular Downlink Capacity via Co-processing at the Transmitting End, Proceedings of IEEE VTC-Spring, vol. 3, 2001, pp. 1745-1749.

Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.

Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.

Wu, et al., Cloud Radio Access Network (C-RAN): A Primer, IEEE Network, vol. 29, No. 1, pp. 35-41, Jan./Feb. 2015.

Wu, et al., Centralized and Distributed Schedulers for Non-Coherent Joint Transmission, Sep. 2018.

Zhou, et al., Distributed Wireless Communication System: A New Architecture for Future Public Wireless Access, IEEE Communications Magazine, vol. 41, No. 3, pp. 108-113, Mar. 2003.

International Preliminary Report on Patentability for International Application No. PCT/US2019/063350, dated May 25, 2021, in 5 pages.

* cited by examiner

SECOND TIME SLOT

NON-COHERENT COOPERATIVE MULTIPLE-INPUT MULTIPLE-OUTPUT COMMUNICATIONS

CROSS-REFERENCE TO RELATED APPLICATIONS

This application claims priority under 35 U.S.C. § 119(e) to U.S. Provisional Patent Application No. 62/771,994, entitled "NON-COHERENT COOPERATIVE MULTIPLE-INPUT MULTIPLE-OUTPUT COMMUNICATIONS" and filed on Nov. 27, 2018, the entire disclosure of which is hereby incorporated by reference herein.

BACKGROUND

Technical Field

Embodiments of this disclosure relate to wireless communication systems such as cooperative multiple-input multiple output wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

SUMMARY

One aspect of the disclosure provides a network system operating in a millimeter wave frequency band. The network system comprises a first serving node comprising a first plurality of antenna elements, the first serving node configured to transmit first beam pilots via the first plurality of antenna elements across a first plurality of spatial beams and receive, from one or more user equipment (UEs), link strength data associated with the first plurality of spatial beams in response to the transmission. The network system further comprises a second serving node comprising a second plurality of antenna elements, the second serving node configured to transmit second beam pilots via the second plurality of antenna elements across a second plurality of spatial beams and receive, from the one or more UEs, link strength data associated with the second plurality of spatial beams in response to the transmission. The network system further comprises a baseband unit scheduler in communication with the first and second serving nodes, the baseband unit scheduler comprising a processor and computer-executable instructions, where the computer-executable instructions, when executed by the processor, cause the baseband unit scheduler to: select, based on the link strength data associated with the first plurality of spatial beams and the link strength data associated with the second plurality of spatial beams, at least one spatial beam in the first plurality of spatial beams and at least one spatial beam in the second plurality of spatial beams to serve a first UE in the one or more UEs; generate an active set for the UE that identifies the selected spatial beams; and cause transmission of downlink data to the first UE across the selected spatial beams identified in the active set.

The network system of the preceding paragraph can include any sub-combination of the following features: where the computer-executable instructions, when executed, further cause the baseband unit scheduler to: cause transmission of a packet to the first UE across the at least one spatial beam in the first plurality of spatial beams, and cause transmission of the same packet to the first UE across the at least one spatial beam in the second plurality of spatial beams; where the computer-executable instructions, when executed, further cause the baseband unit scheduler to select the at least one spatial beam in the first plurality of spatial beams and the at least one spatial beam in the second plurality of spatial beams to serve the first UE based on information indicating spatial beams used to serve at least one UE in the one or more UEs that is different from the first UE; where the first serving node is configured to receive uplink reference signals via at least one of the first plurality of antenna elements across at least one of the first plurality of spatial beams, and where the second serving node is configured to receive second uplink reference signals via at least one of the second plurality of antenna elements across at least one of the second plurality of spatial beams; where the computer-executable instructions, when executed, further cause the baseband unit scheduler to determine a range of directions from which spatial beams of the first UE originate using at least one of the uplink reference signals or the second uplink reference signals; where the first serving node is further configured to transmit the first beam pilots via the first plurality of antenna elements across the first plurality of spatial beams in a direction corresponding to the determine range of directions; where the second serving node is further configured to transmit the second beam pilots via the second plurality of antenna elements across the second plurality of spatial beams in a direction corresponding to the determine range of directions; where the computer-executable instructions, when executed, further cause the baseband unit scheduler to determine a range of directions from which spatial beams of the first UE originate using the uplink reference signals and spatial signatures of each of the first plurality of antenna elements that receive the uplink reference signals; where the uplink reference signals comprise at least one of sounding reference signals or demodulation reference signals; where the computer-executable instructions, when executed, further cause the baseband unit scheduler to select, based on the link strength data associated with the first plurality of spatial beams, the link strength data associated with the second plurality of spatial beams, and the uplink reference signals, at least one spatial beam in the first plurality of spatial beams and at least one spatial beam in the second plurality of spatial beams to serve the first UE; where the selected spatial beams comprises a first spatial beam in the first plurality of spatial beams and a second spatial beam in the second plurality of spatial beams; where the first serving node is further configured to transmit the downlink data to the first UE via a first antenna element in the first plurality of antenna elements across the first spatial beam; where the first serving node is further configured to receive a no acknowledgment message from the first UE in response to transmission of the downlink data to the first UE via the first antenna element across the first spatial beam; where the first serving node is further configured to re-transmit the downlink data to the first UE via the first antenna element across the first spatial beam in response to receipt of the no acknowledgment message; where the second serving node is further configured to transmit the downlink data to the first UE via a second antenna element in the second plurality of antenna elements across the second spatial beam in response to receipt of the no acknowledgment message; where at least one of the first serving node is configured to re-transmit the downlink data to the first UE via the first antenna element across the first spatial beam or the second serving node is configured to transmit the downlink data to the first UE via a second antenna element in the second plurality of antenna elements across the second spatial beam in response to receipt of the no acknowledgment message; and where the millimeter wave frequency band comprises a frequency range between 24 GHz and 300 GHz.

Another aspect of the disclosure provides a computer-implemented method comprising: causing a first serving node comprising a first plurality of antenna elements to transmit first beam pilots via the first plurality of antenna elements across a first plurality of spatial beams, where the first serving node is configured to receive, from one or more user equipment (UEs), link strength data associated with the first plurality of spatial beams in response to the transmission; causing a second serving node comprising a second plurality of antenna elements to transmit second beam pilots via the second plurality of antenna elements across a second plurality of spatial beams, where the second serving node is configured to receive, from the one or more UEs, link strength data associated with the second plurality of spatial beams in response to the transmission; selecting, based on the link strength data associated with the first plurality of spatial beams and the link strength data associated with the second plurality of spatial beams, at least one spatial beam in the first plurality of spatial beams and at least one spatial beam in the second plurality of spatial beams to serve a first UE in the one or more UEs; generating an active set for the UE that identifies the selected spatial beams; and causing transmission of downlink data to the first UE across the selected spatial beams identified in the active set.

The computer-implemented method of the preceding paragraph can include any sub-combination of the following features: where the first serving node is configured to receive uplink reference signals via at least one of the first plurality of antenna elements across at least one of the first plurality of spatial beams, and where the second serving node is configured to receive second uplink reference signals via at least one of the second plurality of antenna elements across at least one of the second plurality of spatial beams; where the computer-implemented method further comprises determining a range of directions from which spatial beams of the first UE originate using at least one of the uplink reference signals or the second uplink reference signals; where the first serving node is further configured to transmit the first beam pilots via the first plurality of antenna elements across the first plurality of spatial beams in a direction corresponding to the determine range of directions; and where the uplink reference signals comprise at least one of sounding reference signals or demodulation reference signals.

Another aspect of the disclosure provides non-transitory, computer-readable storage media comprising computer-executable instructions, where the computer-executable instructions, when executed by a scheduler in a baseband unit, cause the baseband unit to: cause a first serving node comprising a first plurality of antenna elements to transmit first beam pilots via the first plurality of antenna elements across a first plurality of spatial beams, where the first serving node is configured to receive, from one or more user equipment (UEs), link strength data associated with the first plurality of spatial beams in response to the transmission; cause a second serving node comprising a second plurality of antenna elements to transmit second beam pilots via the second plurality of antenna elements across a second plurality of spatial beams, where the second serving node is configured to receive, from the one or more UEs, link strength data associated with the second plurality of spatial beams in response to the transmission; select, based on the link strength data associated with the first plurality of spatial beams and the link strength data associated with the second plurality of spatial beams, at least one spatial beam in the first plurality of spatial beams and at least one spatial beam in the second plurality of spatial beams to serve a first UE in the one or more UEs; generate an active set for the UE that identifies the selected spatial beams; and cause transmission of downlink data to the first UE across the selected spatial beams identified in the active set.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
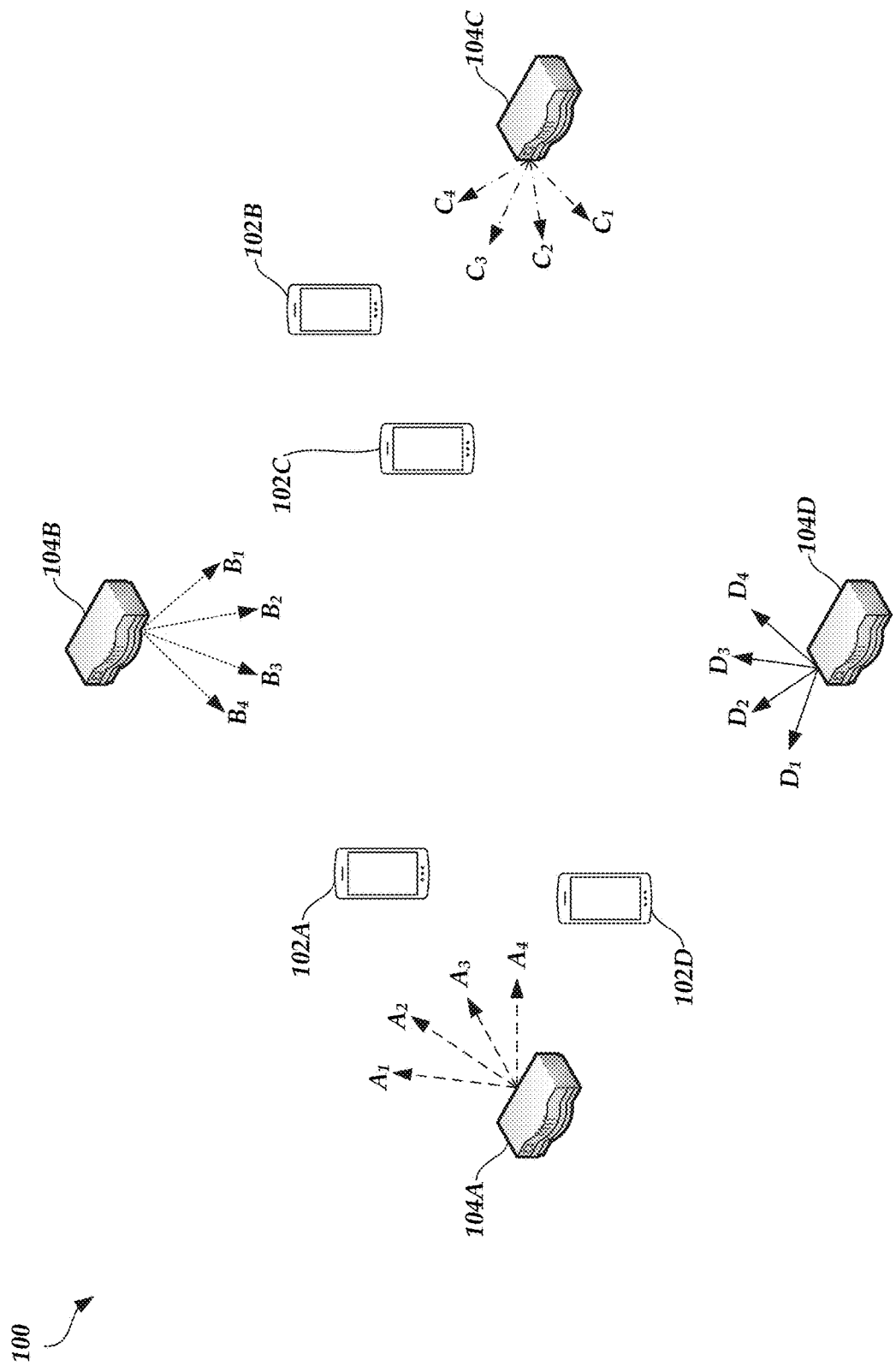
FIG. 1A is a diagram illustrating a cooperative MIMO network environment in which UEs and RRUs of a network wirelessly communicate according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

As wireless networks are increasingly used to run services sensitive to reliability and/or latency issues (e.g., media streaming, video chat, virtual reality, etc.), multi-antenna techniques have served as a prominent solution for minimizing such issues. For example, one type of multi-antenna solution is a traditional multiple-input multiple-output (MIMO) network in which transmitters and receivers each have multiple antennas over which communications are sent. However, it has become difficult for certain wireless devices (e.g., user equipment (UE), base stations, etc.) to support multiple antennas and/or proper spacing between antennas as the devices have evolved. Cooperative MIMO networks, on the other hand, can achieve the benefits of traditional MIMO networks without being constrained by whether the wireless devices can support multiple antennas. For example, one or more wireless devices can be grouped together to create a virtual antenna array, and the grouped wireless devices together can act as a MIMO device.

One version of Cooperative MIMO is Coordinated Multipoint (CoMP) in which one or more base stations share data, channel state information, etc., coordinating downlink transmissions and jointly processing uplink transmissions. Because base stations coordinate downlink transmissions, disruptions and/or interruptions caused by handing over a UE from one base station to another can be avoided. In addition, the base stations can work collectively to cover geographic areas that otherwise may not be covered by any single base station. Thus, a CoMP network may provide a seamless area of coverage for a UE.

Typically, CoMP is implemented by having UEs coherently combine signals received from the base stations. Coherently combining signals can allow a UE to achieve better performance. Coherent combination, however, involves increased network overhead because the base stations are typically calibrated to ensure that the base stations transmit in phase. In fact, calibration becomes increasingly more difficult as transmit frequencies increase. For example, calibration can be especially difficult in millimeter wave (mmW) frequencies, such as between 24 GHz to 300 GHz. In general, mmW frequencies can encompass at least some frequency ranges in the Super high frequency (SHF) bands (e.g., 3 GHz to 30 GHz) and/or at least some frequency ranges in the Extremely High Frequency (EHF) bands (e.g., 30 GHz to 300 GHz).

To reduce the network overhead, CoMP could be implemented by having UEs non-coherently combine signals. Non-coherent combination would not involve the base stations to be calibrated to transmit in phase, thereby reducing the network overhead. On the other hand, the gains achieved by a UE non-coherently combining signals may not be as high as the gains achieved by a UE coherently combining signals. However, the difference in performance may be mitigated at higher frequencies, such as at mmW frequencies, given the high throughput that can be achieved at these higher frequencies. Thus, because coherent combining results in increased network overhead at higher frequencies and the difference in coherent combining and non-coherent combining performance can be mitigated at higher frequencies, implementing CoMP by having UEs non-coherently combine signals may be viable if such a network can also achieve low latency and high reliability.

In addition, latency may be a performance metric evaluated on wireless networks that run certain services, such as services that prefer latencies between 10 ms and 1 ms, if not lower. For these services, it may be desirable to avoid and/or reduce the reliance on associated network Layer 3 (L3) procedures (e.g., L3 handover procedures) if, for example, mobility is involved. A single-frequency network (SFN), in which multiple transmitters simultaneously transmit the same data over the same frequency channel to a wireless device, could be used for broadcast transmission reliability and/or efficient network resource management. However, SFN techniques can also be used in a low latency context because, for example, it may appear to the wireless device that just one cell is transmitting (e.g., because the transmitters may each transmit using the same physical cell ID).

Moreover, reliability may be a performance metric evaluated on wireless networks that run certain services, such as services that are sensitive to packet loss. To increase redundancy, and therefore reliability, the wireless network can trade-off network capacity for redundancy if the wireless network otherwise has a sufficient amount of network capacity to handle transmissions. A wireless network operating at high frequencies (e.g., mmW frequencies) may be able to sacrifice some capacity in favor of redundancy because, for example, the capacity per link may be relatively high given the high bandwidth and signal to noise ratio (SNR) at mmW frequencies. In fact, sacrificing some capacity in favor of redundancy may be desirable given that transmissions at mmW frequencies may typically be unreliable due to relatively high propagation losses at these frequencies.

Accordingly, aspects of this disclosure relate to a CoMP network operating in a mmW frequency band in which UEs combine signals received across one or more spatial beams from one or more base stations. As described in greater detail below, the improved CoMP network can achieve high throughput, low latency, and/or high reliability while maintaining a reasonable network complexity (e.g., lower network overhead than CoMP networks implemented with coherent combining). For example, the improved CoMP network can include a central processing system (e.g., a baseband unit (BBU)), one or more remote radio units (RRUs), and one or more UEs. The RRUs may each have one or more transmit antennas that each support one or more digital basebands. In some embodiments, each RRU has the same number of transmit antennas. In other embodiments, some or all RRUs may have a different number of transmit antennas than other RRUs. Thus, the RRUs may collectively be capable of transmitting N spatial beams, where N is the product of the number of RRUs in the improved CoMP network and the number of transmit antennas operated by a single RRU. Alternatively or in addition, the RRUs may each include part or all of the physical layer implementation (e.g., the digital basebands), and the central processing system (e.g., the BBU) may include the media access control (MAC) and/or layers above the MAC layer. The central processing system and/or the RRUs (collectively referred to herein as a "network system") may operate in a training mode and in an operational mode.

In the training mode, the network system (e.g., the RRUs and/or the BBU) can determine a best set of spatial beams to serve to a particular UE. For example, the RRUs can sequentially transmit signals (e.g., synchronization signal block (SSB) signals) across the N spatial beams (e.g., only one RRU transmits a signal across one spatial beam at a time). For some or all of the sequentially transmitted signals, one of more of the UEs can determine a link strength of a spatial beam using the respective transmitted signal and provide the determined link strength to some or all of the RRUs. A UE can provide the determined link strength via a control signaling channel and/or via a channel that will be used to transmit and/or receive data (e.g., in-band signaling). Alternatively or in addition, one or more of the UEs can identify the spatial beam with the best (e.g., highest) link strength and provide this data to some or all of the RRUs. A UE can send separate link strength data transmissions for each spatial beam or can aggregate the link strength data corresponding to a plurality of spatial beams and send the aggregated link strength data as a single transmission.

Optionally, the RRUs can sequentially transmit signals across the N spatial beams in one or more different passes during the training mode. For example, the RRUs can initially transmit the signals sequentially in a first pass over a wide area (e.g., a 30 degree angle, a 60 degree angle, a 90 degree angle, etc.) and the UE(s) can provide the determined link strength or simply provide an acknowledgement message in response. The network system can use the messages received from the UE(s) to determine a general direction from which spatial beams of the respective UE originate. The RRUs can then transmit the signals sequentially again in a second pass over a finer area (e.g., a 5 degree angle, a 10 degree angle, etc.) that has a smaller angle than the previous transmission of signals and that encompasses the determined general direction from which spatial beams of the respective UE originate, and the UE(s) can provide the determined link strength or simply provide an acknowledgement message in response. The network system can use the messages received from the UE(s) in the second pass to determine a more specific direction from which spatial beams of the respective UE originate. The network system can perform zero or more additional passes to eventually determine a direction or range of directions from which spatial beams of the respective UE originate for the purposes of selecting the appropriate spatial beam(s) to serve to the respective UE.

While the multi-pass training process described above allows the network system to eventually identify, for each UE, one or more spatial beams to serve to the respective UE when transmitting data, the multi-pass training process can be slow given that transmitting the signals to the UE(s) over a wide area is time-consuming and transmitting the signals in different passes is even more time-consuming even if each subsequent pass takes less time than the previous pass. Thus, it may be beneficial to use other network data to reduce the number of passes in the training process and/or to limit the number of passes to one while still accurately determining a direction from which spatial beams of a UE originate. For example, using uplink reference signals (e.g., sounding reference signals (SRSs), demodulation reference signals (DMRSs), etc.) may allow the network system to reduce the number of passes during the training mode.

Generally, the network system can use uplink reference signals obtained by antenna(s) of the RRU(s) to estimate a quality of the uplink channel and/or downlink channel. In mmW frequency bands, however, the phase noise is typically very high on the uplink channel. Thus, any uplink and/or downlink channel quality estimate derived from the uplink reference signals is likely to be inaccurate—even if the network system attempts to perform a calibration—and therefore uplink reference signals are not used by network systems operating in the mmW frequency bands.

The present disclosure, however, describes a network system operating in the mmW frequency bands that can use the uplink reference signals to determine a general spatial direction from which spatial beams of a UE originate. For example, the network system can instruct or otherwise trigger one or more UEs to transmit uplink reference signals periodically. Antenna(s) of the RRU(s) can each receive an uplink reference signal. Based on an uplink reference signal received by an RRU antenna and a spatial signature of the RRU antenna, the network system can determine a phase and amplitude. The network system can use the phases and amplitudes to determine a general spatial direction (e.g., a general beam pattern) for spatial beams originating from a UE. The network system can then use the general spatial direction to perform a first pass in the training mode in which the RRUs sequentially transmit signals over a finer area that encompasses the determined general direction from which spatial beams of the respective UE originate. The network system can optionally perform zero or more additional passes to eventually determine a direction or range of directions from which spatial beams of the respective UE originate for the purposes of selecting the appropriate spatial beam(s) to serve to the respective UE. In this way, the network system can use the uplink reference signals to skip the pass in which signals are transmitted sequentially over a wide area, thereby reducing the time to complete the training process.

As another example, the RRUs can initially transmit the signals sequentially in a first pass over a wide area and the UE(s) can provide the determined link strength or simply provide an acknowledgement message in response, with either message including the uplink reference signals. Antenna(s) of the RRU(s) can each receive an uplink reference signal. Based on an uplink reference signal received by an RRU antenna and a spatial signature of the RRU antenna, the network system can determine a phase and amplitude. The network system can use the phases and amplitudes to determine a general spatial direction (e.g., a general beam pattern) for spatial beams originating from a UE. The network system can then use the general spatial direction to perform a second pass in the training mode in which the RRUs sequentially transmit signals over a finer area that encompasses the determined general direction from which spatial beams of the respective UE originate and that has an angle that is smaller than if the uplink reference signals were not used to determine the general spatial direction. Thus, the uplink reference signals can be used to reduce the number of passes that may occur after the second pass given that the uplink reference signals result in a smaller area over which the sequential signals are transmitted. The network system can optionally perform zero or more additional passes to eventually determine a direction or range of directions from which spatial beams of the respective UE originate for the purposes of selecting the appropriate spatial beam(s) to serve to the respective UE.

The network system can identify, for each UE, one or more spatial beams to serve to the respective UE when transmitting data based on the link strength data provided by the UE(s), the determined direction or range of directions from which spatial beams of the respective UE originate, and/or other network data. This can involve, for example, RRUs sharing link strength data provided by the UEs and/or providing the link strength data to the BBU. For example, when providing link strength data, a UE may also provide a link quality of the corresponding beam (e.g., channel conditions of the corresponding beam). The network system may use the provided link strength data, the determined direction or range of directions from which spatial beams of the respective UE originate, the beam channel conditions, and/or knowledge of which beams are being used to serve other UEs in determining which spatial beam(s) to allocate to the respective UE. In particular, the determined direction or range of directions from which spatial beams of the respective UE originate can be used by the network system to select spatial beam(s) for the respective UE that are more capable of transmitting in the determined direction or range of directions. Thus, the network system can use the uplink reference signals to not only reduce the time to complete the training mode, but also to improve the accuracy of downlink transmissions.

In some embodiments, the network system can further use the uplink reference signals to determine which spatial beam(s) to allocate to the respective UE. For example, the network system can determine the beam channel conditions based on a weighted combination of the provided link strength data and an uplink channel quality estimate derived from the uplink reference signals. As another example, if there is a delay (e.g., 2 ms, 10 ms, 100 ms, 1 s, etc.) between transmission of the sequential signals that resulted in the UE determining the link strength and receipt of the uplink reference signals, this may indicate that the link strength data and/or link quality data provided by a UE is out of date. Thus, the network system can determine the beam channel conditions using the uplink reference signals instead.

Once the spatial beam(s) are determined, the network system can perform a scheduling operation. For example, the RRUs and/or the BBU can group the determined spatial beam(s) into an active set for the respective UE. In particular, the active set may identify the RRU(s) that will serve the respective UE and/or the spatial beam(s) of the identified node(s) that will serve the respective UE. The RRUs and/or BBU can then schedule data to be transmitted across the spatial beam(s) in the active set to the respective UE. In some cases, the RRUs and/or BBU can schedule data to be transmitted to multiple UEs simultaneously (e.g., if the spatial beam(s) in each UE's active set are not spatially adjacent, such as not spatially adjacent within a threshold angle, within a threshold distance, etc.). In some other cases, the RRUs and/or BBU can perform time division multiplexing operations such that data is scheduled to be transmitted to multiple UEs at different times (e.g., if at least some of the spatial beam(s) in each UE's active set are spatially adjacent, such as spatially adjacent within a threshold angle, within a threshold distance, etc.).

In the operational mode, the RRU(s) that serve a spatial beam in a UE's active set can each transmit the same downlink data to the UE using the spatial beam(s) in the active set. The UE can then combine the received data (e.g., by selecting the best spatial beam, by performing a soft combine, by performing a non-coherent combine, etc.) and perform any corresponding operations. If the UE transmits a no acknowledgement message indicating that downlink data was not received or there was an error in the transmission, any antenna of any RRU that serves a spatial beam in the UE's active set can re-transmit the downlink data, regardless of whether the respective antenna was the antenna that initially transmitted the downlink data that resulted in the no acknowledgement message. Thus, the same antenna that initially transmitted the downlink data, a different antenna than the one that initially transmitted the downlink data, the same antenna that initially transmitted the downlink data and one or more different antennas than the one that initially transmitted the downlink data, or two or more different antennas than the one that initially transmitted the downlink data can re-transmit the downlink data, where each transmitting antenna is an antenna that falls within the UE's active set.

In some embodiments, the UE can continue to monitor the link strength of the spatial beam(s) as data is received from the RRU(s) during the operational mode, and provide the link strength data back to the node(s). The UE can also periodically transmit uplink reference signals during the operational mode. The RRUs and/or BBU can then use the link strength data and/or the uplink reference signals to optionally update, if warranted, the selection of spatial beam(s) in the UE's active set using the operations described above. For example, a network system may update the selection of spatial beam(s) in the UE's active set if additional UEs in the CoMP network affect the quality of the spatial beam(s) currently in the UE's active set, if channel conditions of a spatial beam change, etc.

While the present disclosure is described herein such that the BBU processes link strength data, selects spatial beam(s) for UEs, and performs the scheduling operation, this is not meant to be limiting. In other embodiments, the RRUs may share data and collectively perform the spatial beam selection, scheduling operation, and/or other operations described herein as being performed by the BBU. In such embodiments, the BBU is optionally present.

In an embodiment, the improved CoMP network is designed to operate at higher frequencies, such as at mmW frequencies. The techniques described herein can be applied to networks operating at any suitable range of frequencies. The techniques described herein can be used for a variety of use cases, such as media streaming, video chat, virtual reality, etc.

Finally, the improved CoMP network is described herein as being implemented with UEs non-coherently combining data. UEs can alternatively combine signals received from different RRUs by selecting the best spatial beam, by performing a soft combine, etc.

Cooperative MIMO Network

FIG. 1A is a diagram illustrating a cooperative MIMO network environment 100 in which UEs 102A-102D and RRUs 104A-104D of a network wirelessly communicate according to an embodiment. The cooperative MIMO network can function as a CoMP network in which UEs 102A-102D non-coherently combine downlink data. The RRUs 104A-104D may communicate with each other via a wired and/or wireless connection. The RRUs 104A-104D, directly or via a central processing system (e.g., a BBU comprising a scheduler), may further communicate with a core network (not shown) operated by a network service provider. The RRUs 104A-104D may be configured to transmit data to and/or receive data from UEs 102A-102D at mmW frequencies (e.g., at least some frequency bands encompassing SHF and/or EHF bands, such as 24 GHz to 65 GHz, 30 GHz to 300 GHz, 20 GHz to 60 GHz, etc.).

In some embodiments, the base station functionality is subdivided between a BBU (not shown in FIG. 1A) and multiple RRUs (e.g., RRUs 104A-104D). An RRU may include multiple antennas, and one or more of the antennas may serve as a transmit-receive point (TRP). The RRU and/or a TRP may be referred to as a serving node or a base station. The BBU may be physically coupled to the RRUs 104A-104D, such as a via an optical fiber connection. The BBU (e.g., the scheduler) may provide operational details to an RRU 104A-104D to control transmission and reception of signals from the RRU 104A-104D along with control data and payload data to transmit. The BBU (e.g., the scheduler) may also use link strength, uplink reference signals, and/or other information provided by the UEs 102A-102D to select spatial beam(s) to serve each UE 102A-102D, to create active sets for the UEs 102A-102D, and/or to schedule data transmissions to the UEs 102A-102D. An RRU 104A-104D can provide service to devices (e.g., UEs 102A-102D) within a service area. The RRUs 104A-104D may provide data to the network (e.g., the BBU) received from UEs 102A-102D within a service area associated with the RRUs 104A-104D.

The RRUs 104A-104D may each have one or more transmit antennas that each support one or more digital basebands. In some embodiments, each RRU 104A-104D has the same number of transmit antennas. In other embodiments, some or all RRUs 104A-104D have a different number of transmit antennas than other RRUs 104A-104D. Thus, the RRUs 104A-104D may collectively be capable of transmitting N spatial beams, where N is the product of the number of RRUs 104A-104D in the network environment 100 and the number of transmit antennas operated by a single RRU 104A-104D. Similarly, each RRU 104A-104D can have the same number or different number of receive antennas. The BBU and/or the RRUs 104A-104D can be collectively referred to herein as a "network system."

Various standards and protocols may be included in the environment 100 to wirelessly communicate data between a base station (e.g., an RRU 104) and a wireless communication device (e.g., a UE 102). Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base stations associated with one or more evolved NodeBs (also commonly denoted as enhanced NodeBs, eNodeBs, or eNBs), next generation NodeBs (gNBs), or any other suitable NodeBs (xNBs)). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). A downlink (DL) transmission generally refers to a communication from a base station to the wireless communication device, and an uplink (UL) transmission generally refers to a communication from the wireless communication device to the base station.

As described herein, an RRU 104 may include one or more antennas, and one or more of the antennas may serve as a TRP. An RRU 104 may include multiple antennas to provide multiple-input multiple-output (MIMO) communications. For example, an RRU 104 may be equipped with various numbers of transmit antennas (e.g., 1, 2, 4, 8, or more) that can be used simultaneously for transmission to one or more receivers, such as a UE 102. Receiving devices (e.g., UEs 102) may include more than one receive antenna (e.g., 2, 4, etc.). The array of receive antennas may be configured to simultaneously receive transmissions from the RRU 104. Each antenna included in an RRU 104 may be individually configured to transmit and/or receive according to a specific time, frequency, power, and direction configuration. Similarly, each antenna included in a UE 102 may be individually configured to transmit or receive according to a specific time, frequency, power, and direction configuration. The configuration may be provided by the RRU 104 and/or the BBU. The direction configuration may be generated based on network estimate using channel reciprocity or determined based on feedback from UE 102 via selection of a beamforming codebook index, or a hybrid of the two.

Each RRU 104A-104D may support one or more digital basebands, the number of which may be less than or equal to the number of transmit antennas that the respective RRU 104A-104D has. Thus, assuming each RRU 104A-104D has $N_t$ transmit antennas supported by $N_d$ digital basebands, the maximum number of spatial beams that can be supported by the RRUs 104A-104D is $N_t*4$ (e.g., the number of RRUs 104), referred to herein as $N_{bm}$, and the maximum number of independent streams that can be supported by the RRUs 104A-104D is $N_d*4$ (e.g., the number of RRUs 104), referred to herein as $N_u$. For simplicity and ease of explanation, the RRUs 104A-104D illustrated in FIG. 1A each have 4 transmit antennas and 4 receive antennas. Thus, the maximum number of spatial beams that can be supported by the RRUs 104A-104D is 16. The RRUs 104A-104D can include the same number of receive antennas (e.g., used for UL transmissions) and transmit antennas (e.g., used for DL transmissions) or a different number of receive antennas and transmit antennas. In some embodiments, one or more antennas of an RRU 104A-104D can both transmit DL signals and receive UL signals. The techniques described herein apply whether the RRUs 104A-104D have the same or different number of antennas The RRUs 104A-104D and/or the BBU can operate in a training mode and in an operational mode. In the training mode, the RRUs 104A-104D can trigger or otherwise instruct the UEs 102A-102D to transmit uplink reference signals (e.g., SRSs, DMRSs, etc.) periodically. Antenna(s) of the RRUs 104A104D can each receive an uplink reference signal from each UE 102A-102D in response. Based on an uplink reference signal received by an RRU 104A-104D antenna and a spatial signature of the RRU 104A-104D antenna, the BBU (e.g., the scheduler) can determine a phase and amplitude for a particular combination of UE 102A-102D and uplink reference signal. The BBU can determine the phase and amplitude for a particular combination of UE 102A-102D and uplink reference signal using an uplink reference signal received by one RRU 104A-104D antenna and/or using uplink reference signals received by two or more RRU 104A-104D antennas (e.g., using uplink reference signals received by two or more RRUs 104A-104D). The BBU can aggregate the phases and amplitudes corresponding to a UE 102A-102D and use the phases and amplitudes corresponding to a UE 102A-102D to determine a general spatial direction (e.g., a general beam pattern) for spatial beams originating from the UE 102A-102D. Alternatively, one or more of the RRUs 104A-104D can determine the general spatial direction for spatial beams originating from a UE 102A-102D using the same techniques.

For some or all of the UEs 102A-102D, the BBU can form signals (e.g., SSBs) based on the determined general spatial direction for spatial beams originating from the respective UE 102A-102D. For some or all of the UEs 102A-102D, the RRUs 104A-104D can then send the signals (e.g., SSBs) over a finer area (e.g., a 5 degree angle, a 10 degree angle, a 15 degree angle, etc.) that encompasses the determined general spatial direction instead of over a wider area (e.g., a 30 degree angle, a 60 degree angle, a 90 degree angle, etc.) to determine which spatial beam(s) should serve the respective UE 102A-102D. FIG. 1A illustrates the different spatial beams that may be used to transmit signals for reception or detection by the UEs 102A-102D during the training mode. In the operational mode, the RRUs 104A-104D can send DL data to the UEs 102A-102D using the determined spatial beam(s).

For example, in the training mode after the BBU and/or RRU 104A-104D determines the general spatial direction for spatial beams originating from some or all of the UEs 102A-102D, the RRUs 104A-104D may transmit signals (e.g., SSBs), also referred to herein as beam pilots, for reception by the UEs 102A-102D in a sequential manner and in a general direction corresponding to at least one of the determined general spatial direction for spatial beams originating from some or all of the UEs 102A-102D (e.g., within a 1 degree angle of a determined general spatial direction, within a 2 degree angle of a determined general spatial direction, within a 3 degree angle of a determined general spatial direction, within a 5 degree angle of a determined general spatial direction, within a 10 degree angle of a determined general spatial direction, etc.). In particular, RRU 104A may transmit a signal across a first spatial beam (e.g., $A_1$) using one or more RRU 104A transmit antennas, then transmit a signal across a second spatial beam (e.g., $A_2$) using one or more RRU 104A transmit antennas, and so on. After RRU 104A has transmitted a signal across the four spatial beams served by the RRU 104A (e.g., $A_1, A_2, A_3$, and $A_4$), RRU 104B can begin transmitting a signal across a first spatial beam (e.g., $B_1$) using one or more RRU 104B transmit antennas, then transmit a signal across a second spatial beam (e.g., $B_2$) using one or more RRU 104B transmit antennas, and so on. In total, each RRU 104A-104D may transmit, in sequence, one or more signals across each of the spatial beams served by the respective RRU 104A-104D (e.g., $A_1, A_2, A_3, A_4, B_1, B_2, B_3, B_4, C_1, C_2, C_3, C_4, D_1, D_2, D_3$, and $D_4$). The above example is provided merely for explanatory purposes, as the RRUs 104A-104D can transmit the signals in any order (e.g., RRU 104B can transmit signals before RRU 104A, RRU 104B can transmit a signal across a first spatial beam using one or more RRU 104B transmit antennas after the RRU 104A transmits a signal across a first spatial beam using one or more RRU 104A transmit antennas and before the RRU 104A transmits a signal across a second spatial beam using one or more RRU 104A transmit antennas, etc.). The signals transmitted by each RRU 104A-104D may include the same physical cell ID (PCI), and therefore the signals may appear to the UEs 102A-102D as if the signals are originating from the same node or base station.

As an illustrative example, the RRU 104A can transmit signals across four spatial beams (e.g., $A_1, A_2, A_3$, and $A_4$), the RRU 104B can transmit signals across four spatial beams (e.g., $B_1, B_2, B_3$, and $B_4$), the RRU 104C can transmit signals across four spatial beams (e.g., $C_1, C_2, C_3$, and $C_4$), and the RRU 104D can transmit signals across four spatial beams (e.g., $D_1, D_2, D_3$, and $D_4$). The spatial beams may be positioned in different directions to provide a larger network coverage area. In some embodiments, the different directions correspond to at least one of the general spatial directions determined by the BBU and/or RRU(s) 104A-104D using the uplink reference signals. FIG. 1A depicts example directions of the spatial beams served by the RRUs 104A-104D, but this is not meant to be limiting. The RRUs 104A-104D may direct the spatial beams in any direction.

The UEs 102A-102D can receive or detect a signal transmitted across a spatial beam and determine a link strength (e.g., a signal-to-interference-plus-noise ratio (SINR)) of the spatial beam using the received or detected signal. The UEs 102A-102D can repeat this process for some or all of the spatial beams collectively served by the RRUs 104A-104D. Each UE 102A-102D can then provide an indication of the link strength of a spatial beam to one or more of the RRUs 104A-104D via a control signaling channel and/or via in-band signaling (e.g., using the channel over which data will be transmitted to and/or from the UEs 102A-102D). The UEs 102A-102D may provide the indication of the link strength for each spatial beam in the same transmission or in separate transmissions (e.g., where each transmission corresponds to a particular spatial beam). For example, if transmitting the indication of the link strength via in-band signaling, the UEs 102A-102D may aggregate link strength data (e.g., aggregate the link strength determined for a plurality of spatial beams) and send the aggregated link strength data via a single or a small number of transmissions. For example, the UEs 102A-104D can transmit a link strength vector, where each element of the vector includes an indication of the link strength of a particular spatial beam.

Alternatively or in addition, the UEs 102A-102D may each determine a spatial beam with the best link strength (e.g., highest link strength). The UEs 102A-102D may then transmit an indication of the spatial beam with the best link strength to the RRUs 104A-104D, with or without also providing an indication of the link strengths of the other spatial beams.

The RRUs 104A-104D can forward the link strength data to the BBU. The BBU can then determine a direction or range of directions from which spatial beams of some or all of the UEs 102A-102D originate using the link strength data, and select one or more spatial beams for serving data to the UEs 102A-102D. For example, in addition to providing the spatial beam link strengths, the UEs 102A-102D may also provide an indication of a link quality and/or channel condition of each spatial beam, and the RRUs 104A-104D can forward this information to the BBU. The BBU may also have information indicating the physical layout of the transmit antennas of the RRUs 104A-104D and/or the direction in which such transmit antennas transmit, and the spatial beams that are used to serve other UEs 102A-102D. The RRUS(s) 104A-104D and/or BBU may use the link strengths, the link qualities (e.g., DL link qualities), the transmit antenna physical layout and/or directional information, the determined direction or range of directions from which spatial beams of the respective UE 102A-102D originate, the uplink reference signals, and/or information indicating which spatial beams serve other UEs 102A-102D to select one or more spatial beams for each UE 102A-102D. In particular, the determined direction or range of directions from which spatial beams of the respective UE 102A-102D originate can be used by the BBU and/or RRU(s) 104A-104D to select spatial beam(s) for the respective UE 102A-102D that are more capable of transmitting in the determined direction or range of directions. Thus, the BBU and/or RRU(s) 104A-104D can use the uplink reference signals to not only reduce the time to complete the training mode, but also to improve the accuracy of DL transmissions. As an illustrative example, the BBU may determine that a spatial beam could serve a UE 102A-102D if the link strength of the spatial beam provided by the UE 102A-102D is greater than a threshold value and/or if there is minimal overlap with spatial beams selected to serve other UEs 102A-102D (e.g., the interference with other spatial beams that would result from serving the UE 102A-102D using the spatial beam under consideration is less than a threshold value, if the spatial beam under consideration is not spatially adjacent to another spatial beam used to serve another UE 102A-102D, such as not spatially adjacent within a threshold angle, within a threshold distance, etc.).

In some embodiments, the BBU and/or RRU(s) 104A-104D can further use the uplink reference signals to determine which spatial beam(s) to allocate to a UE 102A-102D. For example, the BBU and/or RRU(s) 104A-104D can determine the beam channel conditions or link qualities based on a weighted combination of the provided link strength data and an uplink channel quality estimate derived from the uplink reference signals. As another example, if there is a delay (e.g., 2 ms, 10 ms, 100 ms, 1 s, etc.) between transmission of the sequential SSBs that resulted in a UE 102A-102D determining the link strength and receipt of the uplink reference signals by the RRUs 104A-104D, this may indicate that the link strength data and/or link quality data provided by a UE 102A-102D is out of date. Thus, the BBU and/or RRU(s) 104A-104D can determine the link qualities using the uplink reference signals instead. In addition, the BBU and/or RRU(s) 104A-104D can use an UL channel quality derived from an uplink reference signal to estimate the DL link quality if the UL channel quality is sufficiently high (e.g., greater than a threshold SNR).

The BBU and/or RRU(s) 104A-104D can optionally perform zero or more additional passes before selecting spatial beam(s) for each UE 102A-102D. For example, after receiving and/or evaluating the link strength data provided by the UEs 102A-102D in response to transmission of the SSBs, the RRUs 104A-104D can transmit another set of SSBs, possibly over a narrower area than the first transmission of the SSBs (with the narrower area being determined by the BBU and/or RRUs 104A-104D based on analyzing the link strength data). The UEs 102A-102D can then provide additional link strength data for evaluation, and the BBU and/or RRU(s) 104A-104D can use the additional link strength data and/or any of the other data described herein to determine a direction or range of directions from which spatial beams of a UE 102A-102D originate. The BBU and/or RRU(s) 104A-104D can then use the determined direction or range of directions to send another round of SSBs to the UEs 102A-102D and repeat the analysis described herein, or can use the determined direction or range of directions to select the appropriate spatial beam(s) to serve to a UE 102A-102D.

To increase redundancy, and therefore reliability, the BBU can select multiple spatial beams from one or more RRUs 104A-104D to a serve a UE 102A-102D. Each spatial beam may be used to transmit the same DL data to the UE 102A-102D, and therefore having multiple spatial beams serving a UE 102A-102D may ensure that the UE 102A-102D receives the transmitted data even if other transmissions interfere with one or more spatial beams. The BBU and/or RRUs 104A-104D may be able to sacrifice some capacity in favor of redundancy because, for example, the capacity per link may be relatively high given the high bandwidth and SNR at mmW frequencies. In fact, sacrificing some capacity in favor of redundancy may be desirable given that transmissions at mmW frequencies may typically be unreliable due to relatively high propagation losses at these frequencies.

Once spatial beam(s) are selected for each UE 102A-102D, the BBU can group the spatial beam(s) selected for a UE 102A-102D into an active set for the UE 102A-102D. The active set may identify each RRU 104A-104D and spatial beam pair selected to serve a particular UE 102A-102D. The set of spatial beams serving a UE 102A-102D may be considered the active set of the UE 102A-102D. As an illustrative example, the active set may be in the following format: {(node name, spatial beam), (node name, spatial beam), (node name, spatial beam), . . . }.

Figure 1B:
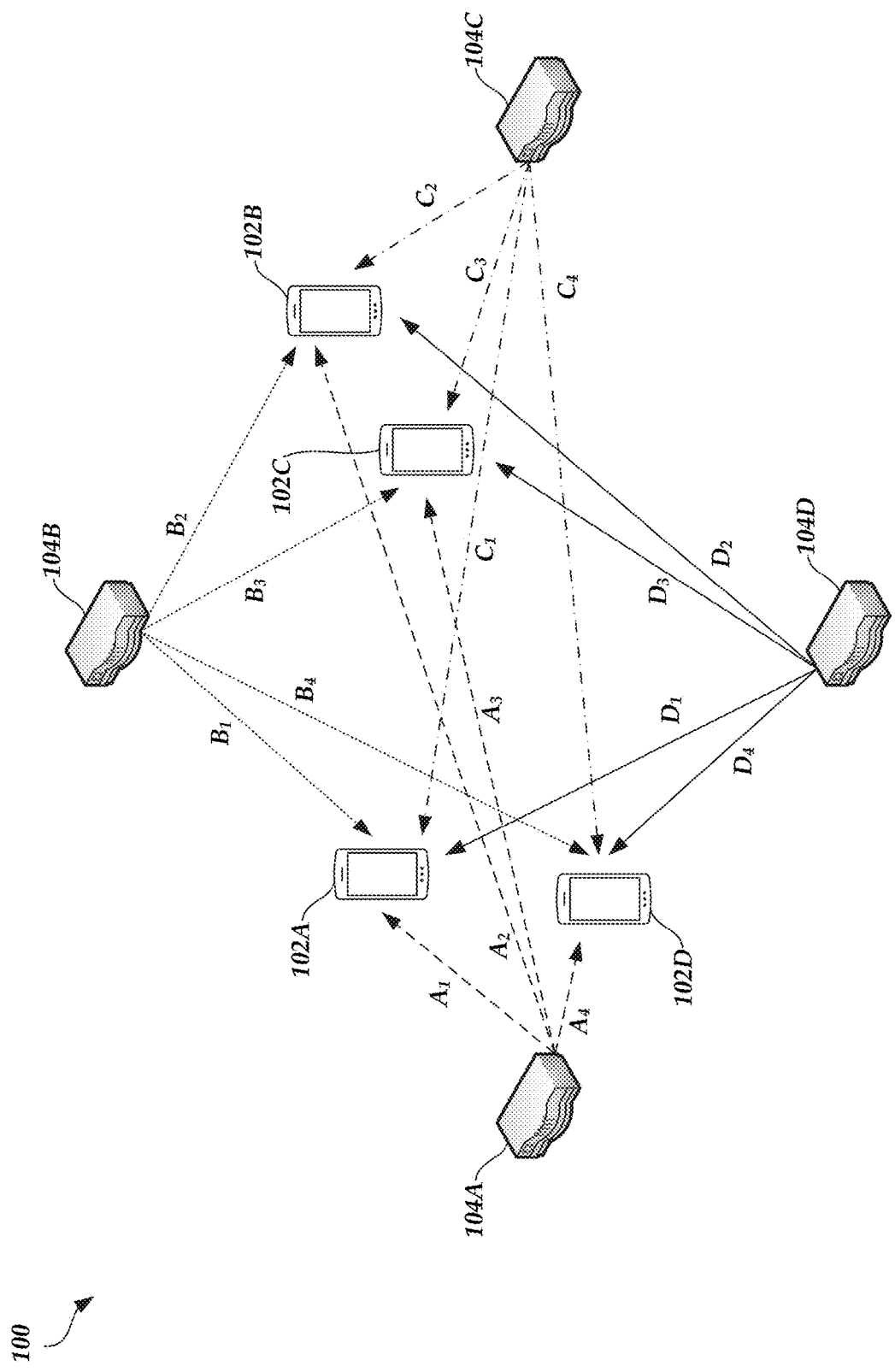
FIG. 1B is a diagram illustrating the spatial beams selected to serve the UEs of FIG. 1A according to an embodiment.

FIG. 1B is a diagram illustrating the spatial beams selected to serve the UEs 102A-102D according to an embodiment. As illustrated in FIG. 1B, the BBU has selected one spatial beam from each RRU 104A-104D to serve each UE 102A-102D. For example, the BBU has selected spatial beams $A_1$, $B_1$, $C_1$, and $D_1$ to serve the UE 102A, spatial beams $A_2$, $B_2$, $C_2$, and $D_2$ to serve the UE 102B, spatial beams $A_3$, $B_3$, $C_3$, and $D_3$ to serve the UE 102C, and spatial beams $A_4$, $B_4$, $C_4$, and $D_4$ to serve the UE 102D. Thus, the active set for the UE 102A can be represented as {(RRU 104A, $A_1$), {(RRU 104B, $B_1$), (RRU 104C, $C_1$), {(RRU 104D, $D_1$)}, the active set for the UE 102B can be represented as {(RRU 104A, $A_2$), (RRU 104B, $B_2$), (RRU 104C, $C_2$), (RRU 104D, $D_2$)}, the active set for the UE 102C can be represented as {(RRU 104A, $A_3$), (RRU 104B, $B_3$), (RRU 104C, $C_3$), (RRU 104D, $D_3$)}, and the active set for the UE 102D can be represented as {(RRU 104A, $A_4$), (RRU 104B, $B_4$), (RRU 104C, $C_4$), (RRU 104D, $D_4$)}.

While FIG. 1B depicts no more than one spatial beam from a particular RRU 104A-104D being selected to serve a UE 102A-102D, this is not meant to be limiting. Two or more spatial beams from a particular RRU 104A-104D can be selected to serve a UE 102A-102D.

Once the active sets are created, the BBU can transmit active set data (e.g., information identifying the spatial beam(s) selected to serve one or more UEs 102A-102D) to one or more of the RRUs 104A-104D for transmission to one of more of the UEs 102A-102D. Thus, the UEs 102A-102D may receive information indicating on which spatial beam(s) to expect DL data to be transmitted. The UEs 102A-102D may each include a receiver, and each UE 102A-102D may configure the receiver to receive DL data associated with the spatial beam(s) identified in the active set data as being selected to serve the respective UE 102A-102D. Before, during, and/or after transmitting the active set data, the BBU can schedule corresponding DL data transmissions. The BBU may schedule simultaneous transmissions to different UEs 102A-102D if the spatial beam(s) in each UE's active set are not spatially adjacent, such as not spatially adjacent within a threshold angle, within a threshold distance, etc. If at least one spatial beam in each UE's active set is spatially adjacent (e.g., spatially adjacent within a threshold angle, within a threshold distance, etc.), then the BBU can implement time division multiplexing such that transmissions are sent to the UEs 102A-102D at different times to avoid potential interference.

Here, spatial beams $A_1$ and $A_4$ may be spatially adjacent, spatial beams $A_2$ and $A_3$ may be spatially adjacent, spatial beams $B_1$ and $B_4$ may be spatially adjacent, spatial beams $B_2$ and $B_3$ may be spatially adjacent, spatial beams $C_1$ and $C_4$ may be spatially adjacent, spatial beams $C_2$ and $C_3$ may be spatially adjacent, spatial beams $D_1$ and $D_4$ may be spatially adjacent, and spatial beams $D_2$ and $D_3$ may be spatially adjacent. Thus, the BBU may schedule data transmissions such that transmissions across spatial beam $A_1$ occur at different times than transmissions across spatial beam $A_4$, such that transmissions across spatial beam $A_2$ occur at different times than transmissions across spatial beam $A_3$, such that transmissions across spatial beam $B_1$ occur at different times than transmissions across spatial beam $B_4$, such that transmissions across spatial beam $B_2$ occur at different times than transmissions across spatial beam $B_3$, such that transmissions across spatial beam $C_1$ occur at different times than transmissions across spatial beam $C_4$, such that transmissions across spatial beam $C_2$ occur at different times than transmissions across spatial beam $C_3$, such that transmissions across spatial beam $D_1$ occur at different times than transmissions across spatial beam $D_4$, and such that transmissions across spatial beam $D_2$ occur at different times than transmissions across spatial beam $D_3$.

Figure 1C:
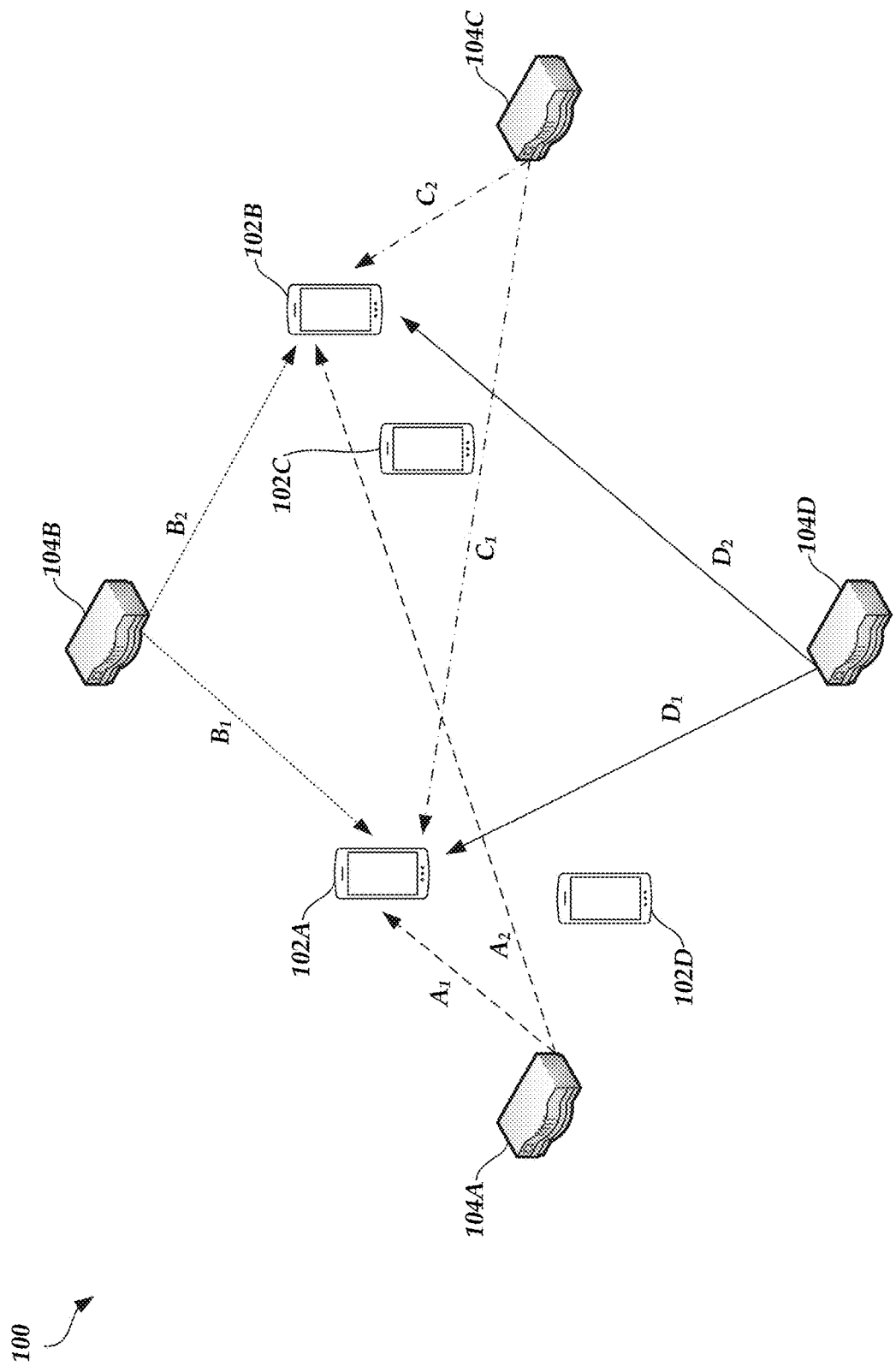
FIG. 1C is a diagram illustrating DL data transmissions occurring during a first time slot according to an embodiment.

FIG. 1C is a diagram illustrating DL data transmissions occurring during a first time slot according to an embodiment. As illustrated in FIG. 1C, RRU 104A transmits DL data across spatial beams $A_1$ and $A_2$ during the first time slot because such spatial beams are not spatially adjacent. Similarly, RRU 104B transmits DL data across spatial beams $B_1$ and $B_2$ during the first time slot because such spatial beams are not spatially adjacent, RRU 104C transmits DL data across spatial beams $C_1$ and $C_2$ during the first time slot because such spatial beams are not spatially adjacent, and RRU 104D transmits DL data across spatial beams $D_1$ and $D_2$ during the first time slot because such spatial beams are not spatially adjacent.

Figure 1D:
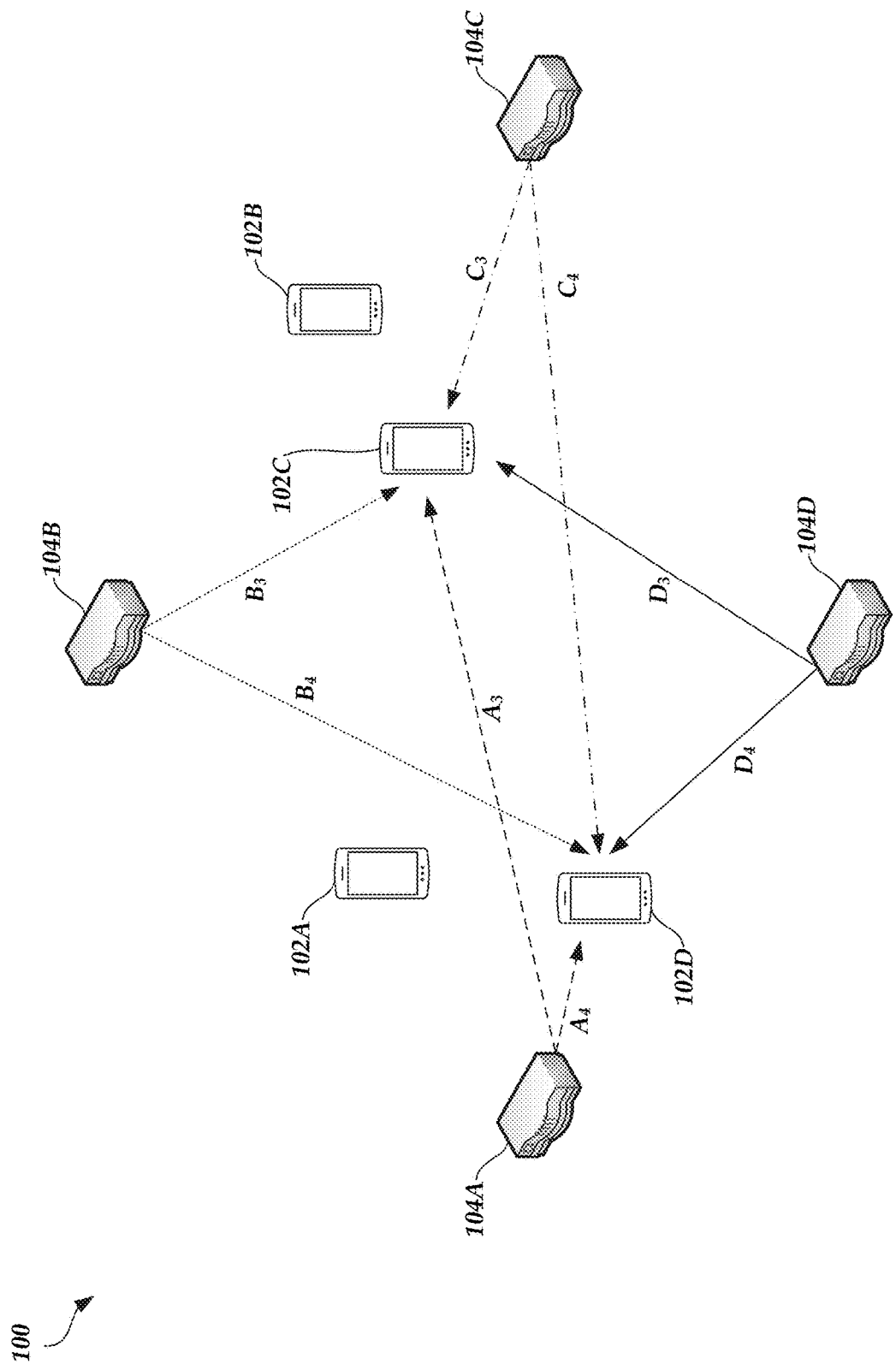
FIG. 1D is a diagram illustrating DL data transmissions occurring during a second time slot according to an embodiment.

FIG. 1D is a diagram illustrating DL data transmissions occurring during a second time slot according to an embodiment. The second time slot may be before or after the first time slot of FIG. 1C. As illustrated in FIG. 1D, RRU 104A transmits DL data across spatial beams $A_3$ and $A_4$ during the second time slot because such spatial beams are not spatially adjacent. Similarly, RRU 104B transmits DL data across spatial beams $B_3$ and $B_4$ during the second time slot because such spatial beams are not spatially adjacent, RRU 104C transmits DL data across spatial beams $C_3$ and $C_4$ during the second time slot because such spatial beams are not spatially adjacent, and RRU 104D transmits DL data across spatial beams $D_3$ and $D_4$ during the second time slot because such spatial beams are not spatially adjacent.

Figure 1E:
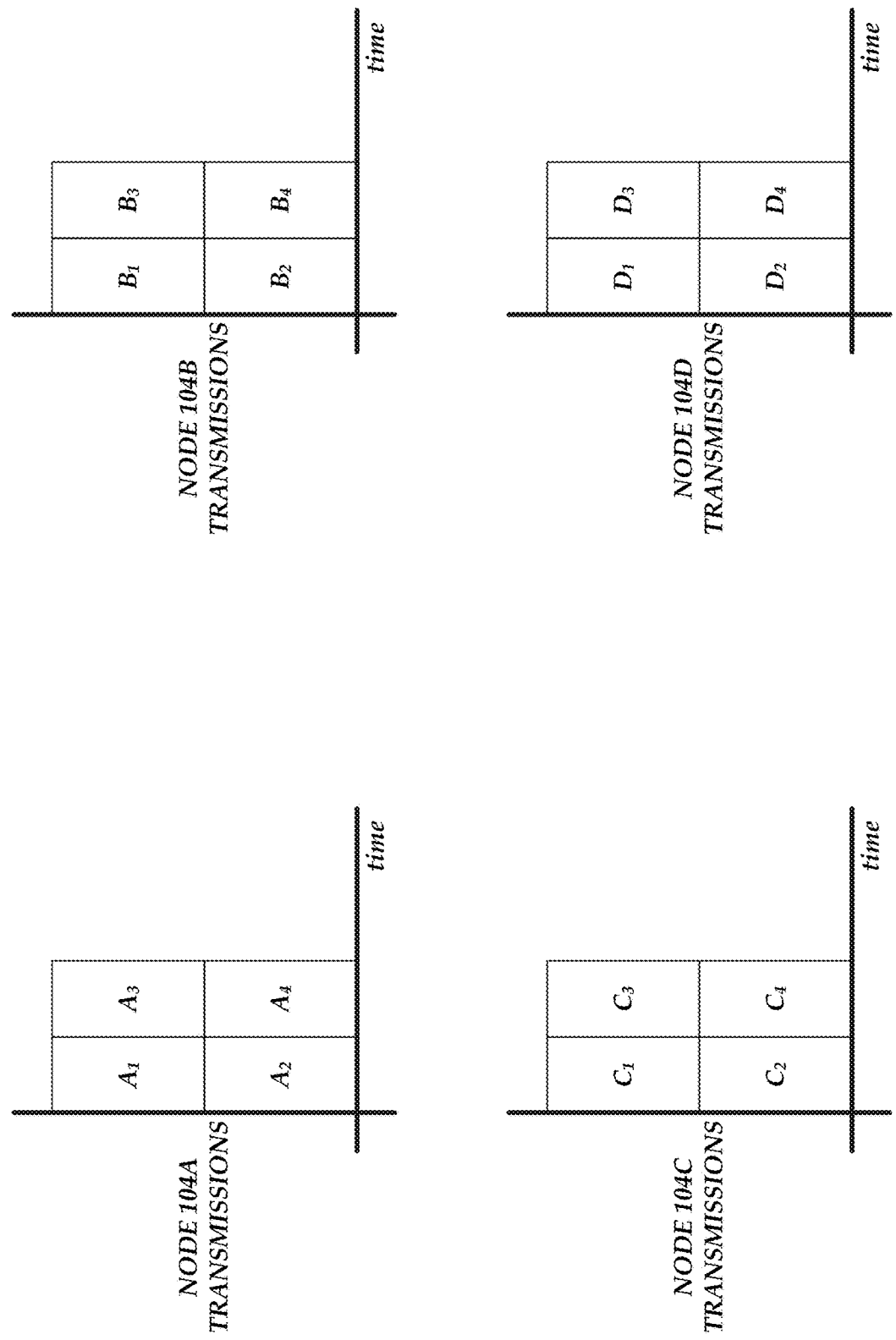
FIG. 1E illustrates a timing diagram for scheduled DL transmissions from the RRUs of FIG. 1A during the operational mode.

FIG. 1E illustrates a timing diagram for scheduled DL transmissions from the RRUs 104A-104D during the operational mode. The timing diagram represents in graph form the DL data transmission timing described above with respect to FIGS. 1B-1D. As illustrated in FIG. 1E, the RRU 104A transmits DL data across the spatial beams $A_1$ and $A_2$ during one time slot, and transmits data across the spatial beams $A_3$ and $A_4$ during another time slot. Alternatively, the RRU 104A can transmit DL data across the spatial beam $A_3$ during the same time slot as the spatial beam $A_1$ and/or can transmit DL data across the spatial beam $A_2$ during the same time slot as the spatial beam $A_4$ because spatial beams $A_1$ and $A_3$ may not be spatially adjacent and spatial beams $A_2$ and $A_4$ may not be spatially adjacent.

Similarly, the RRU 104B transmits DL data across the spatial beams $B_1$ and $B_2$ during one time slot, and transmits data across the spatial beams $B_3$ and $B_4$ during another time slot. Alternatively, the RRU 104B can transmit DL data across the spatial beam $B_3$ during the same time slot as the spatial beam $B_1$ and/or can transmit DL data across the spatial beam $B_2$ during the same time slot as the spatial beam $B_4$ because spatial beams $B_1$ and $B_3$ may not be spatially adjacent and spatial beams $B_2$ and $B_4$ may not be spatially adjacent.

The RRU 104C can transmit DL data across the spatial beams $C_1$ and $C_2$ during one time slot, and transmit data across the spatial beams $C_3$ and $C_4$ during another time slot. Alternatively, the RRU 104C can transmit DL data across the spatial beam $C_3$ during the same time slot as the spatial beam $C_1$ and/or can transmit DL data across the spatial beam $C_2$ during the same time slot as the spatial beam $C_4$ because spatial beams $C_1$ and $C_3$ may not be spatially adjacent and spatial beams $C_2$ and $C_4$ may not be spatially adjacent.

The RRU 104D can transmit DL data across the spatial beams $D_1$ and $D_2$ during one time slot, and transmit data across the spatial beams $D_3$ and $D_4$ during another time slot. Alternatively, the RRU 104D can transmit DL data across the spatial beam $D_3$ during the same time slot as the spatial beam $D_1$ and/or can transmit DL data across the spatial beam $D_2$ during the same time slot as the spatial beam $D_4$ because spatial beams $D_1$ and $D_3$ may not be spatially adjacent and spatial beams $D_2$ and $D_4$ may not be spatially adjacent.

The spatial beams that form the active set for a particular UE 102A-102D may be used to transmit the same DL data to the UE 102A-102D at the same time. For example, the RRU 104A, the RRU 104B, the RRU 104C, and the RRU 104D may transmit the same DL data to the UE 102A at the same time during the operational mode, with the RRU 104A transmitting the DL data over the spatial beam $A_1$, the RRU 104BA transmitting the DL data over the spatial beam $B_1$, the RRU 104C transmitting the DL data over the spatial beam $C_1$, and the RRU 104D transmitting the DL data over the spatial beam $D_1$.

In further embodiments, if a UE 102A-102D transmits a no acknowledgement message indicating that DL data was not received or there was an error in the DL data transmission, any antenna of any RRU 104A-104D that serves a spatial beam in the UE's 102A-102D active set can re-transmit the DL data, regardless of whether the respective antenna was the antenna that initially transmitted the DL data that resulted in the no acknowledgement message. For example, if an antenna of the RRU 104D transmitted DL data to the UE 102A across spatial beam $D_1$, and the UE 102A returned a no acknowledgment message in response, the DL data can be retransmitted to the UE 102A across any combination of the spatial beams $A_1$, $B_1$, $C_1$, and $D_1$ given that each spatial beam forms the UE 102A active set. Thus, the same antenna of an RRU 104A-104D that initially transmitted the DL data, a different antenna of an RRU 104A-104D than the one that initially transmitted the DL data, the same antenna of an RRU 104A-104D that initially transmitted the DL data and one or more different antennas of one or more different RRUs 104A-104D than the one that initially transmitted the DL data, or two or more different antennas of one or more different RRUs 104A-104D than the one that initially transmitted the DL data can re-transmit the DL data, where each transmitting antenna is an antenna that transmits across a spatial beam that forms the UE's 102A-102D active set.

Figure 2A:
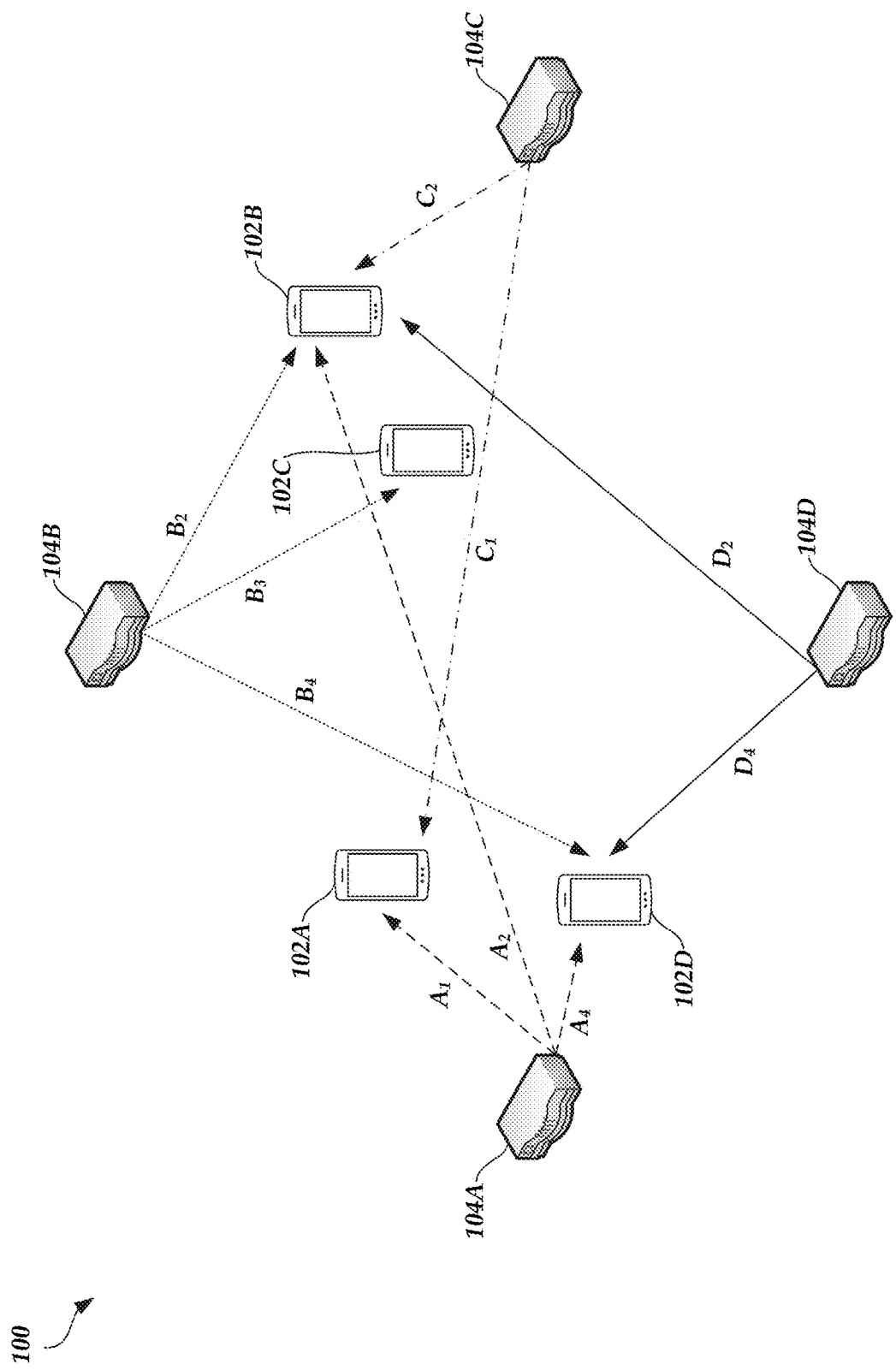
FIG. 2A is another diagram illustrating the spatial beams selected to serve the UEs of FIG. 1A according to an embodiment.

FIG. 2A is another diagram illustrating the spatial beams selected to serve the UEs 102A-102D according to an embodiment. Unlike an embodiment described above with respect to FIGS. 1B-1E, FIG. 2A illustrates an embodiment in which some, but not all, of the RRUs 104A-104D have spatial beams selected to serve all of the UEs 102A-102D. As illustrated in FIG. 2A, the BBU has selected spatial beams $A_1$ and $C_1$ to serve the UE 102A, spatial beams $A_2$, $B_2$, $C_2$, and $D_2$ to serve the UE 102B, spatial beam $B_3$ to serve the UE 102C, and spatial beams $A_4$, $B_4$, and $D_4$ to serve the UE 102D. Thus, the active set for the UE 102A can be represented as {(RRU 104A, $A_1$), (RRU 104C, $C_1$)}, the active set for the UE 102B can be represented as {(RRU 104A, $A_2$), (RRU 104B, $B_2$), (RRU 104C, $C_2$), (RRU 104D, $D_2$)}, the active set for the UE 102C can be represented as {(RRU 104B, $B_3$)}, and the active set for the UE 102D can be represented as {(RRU 104A, $A_4$), (RRU 104B, $B_4$), (RRU 104D, $D_4$)}.

While FIG. 2A depicts no more than one spatial beam from a particular RRU 104A-104D being selected to serve a UE 102A-102D, this is not meant to be limiting. Two or more spatial beams from a particular RRU 104A-104D can be selected to serve a UE 102A-102D.

As described above, the BBU can schedule corresponding DL data transmissions once the active sets are created. The BBU may schedule simultaneous transmissions to different UEs 102A-102D if the spatial beam(s) in each UE's active set are not spatially adjacent, such as not spatially adjacent within a threshold angle, within a threshold distance, etc. If at least one spatial beam in each UE's active set is spatially adjacent (e.g., spatially adjacent within a threshold angle, within a threshold distance, etc.), then the BBU can implement time division multiplexing such that transmissions are sent to the UEs 102A-102D at different times to avoid potential interference.

Here, spatial beams $A_1$ and $A_4$ may be spatially adjacent, and spatial beams $B_2$ and $B_3$ may be spatially adjacent. Thus, the BBU may schedule data transmissions such that transmissions across spatial beam $A_1$ occur at different times than transmissions across spatial beam $A_4$, and such that transmissions across spatial beam $B_2$ occur at different times than transmissions across spatial beam $B_3$. The BBU may schedule data transmissions across the remaining spatial beams at the same time and/or at different times.

Figure 2B:
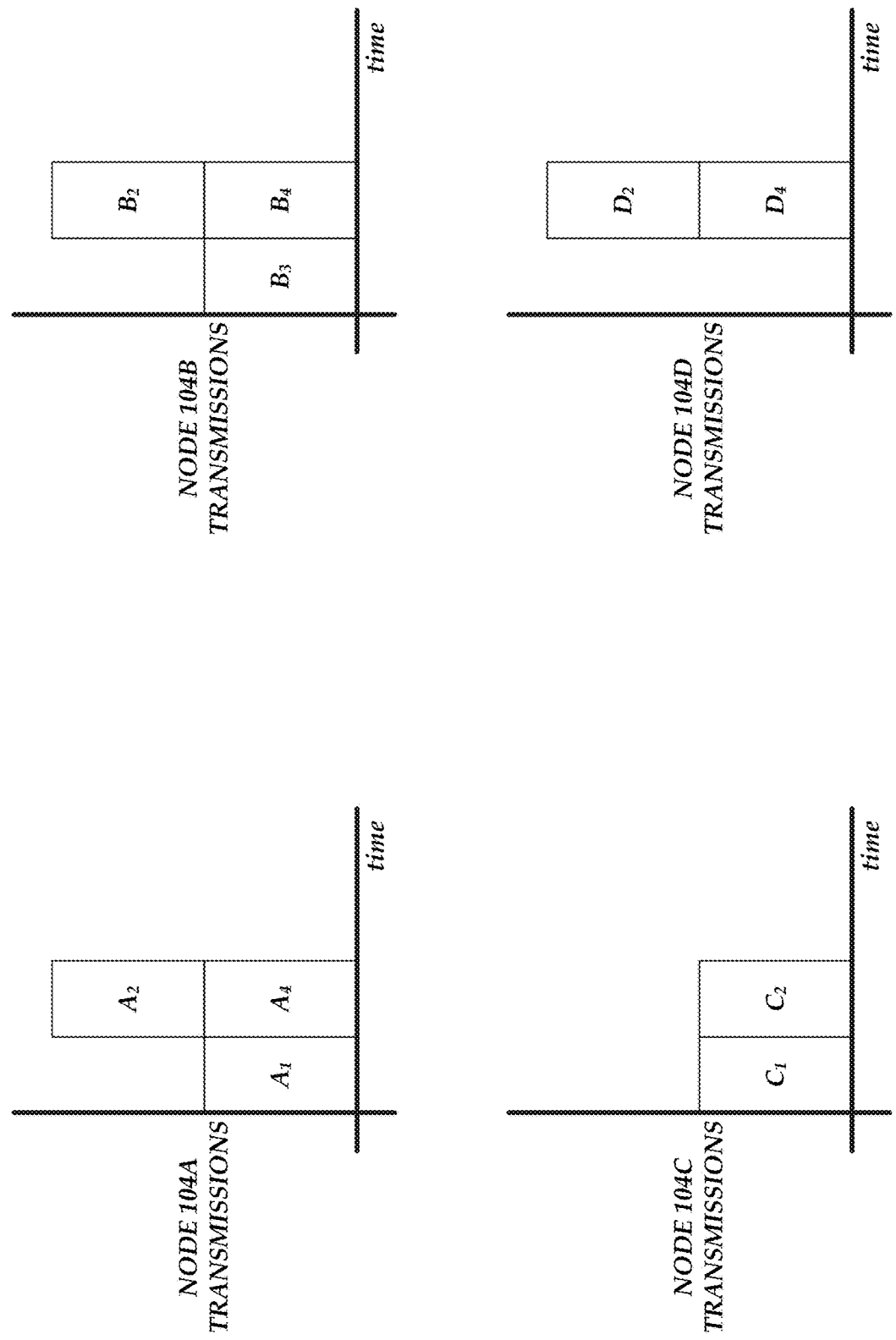
FIG. 2B illustrates another timing diagram for scheduled DL transmissions from the RRUs of FIG. 1A during the operational mode.

FIG. 2B illustrates another timing diagram for scheduled DL transmissions from the RRUs 104A-104D during the operational mode. The timing diagram represents in graph form the DL data transmission timing described above with respect to FIG. 2A. As illustrated in FIG. 2B, the RRU 104A transmits data across the spatial beam $A_1$ during one time slot, and transmits DL data across the spatial beams $A_2$ and $A_4$ during another time slot. Alternatively, the RRU 104A can transmit DL data across the spatial beam $A_2$ during the same time slot as the spatial beam $A_1$ because spatial beams $A_1$ and $A_2$ may not be spatially adjacent.

Similarly, the RRU 104B transmits DL data across the spatial beam $B_3$ during one time slot, and transmits DL data across the spatial beams $B_2$ and $B_4$ during another time slot. Alternatively, the RRU 104B can transmit DL data across the spatial beam $B_4$ during the same time slot as the spatial beam $B_3$ because spatial beams $B_3$ and $B_4$ may not be spatially adjacent.

The RRU 104C can transmit DL data across the spatial beams $C_1$ and $C_2$ during the same time slot or during different time slots because these spatial beams are not spatially adjacent. For example, the RRU 104C may transmit DL data across the spatial beams $C_1$ and $C_2$ during different time slots so that UE 102A receives transmissions across spatial beams $A_1$ and $C_1$ at the same time and/or so that UE 102B receives transmissions across spatial beams $A_2$, $B_2$, $C_2$, and $D_2$ at the same time.

The RRU 104D can transmit DL data across the spatial beams $D_2$ and $D_4$ during the same time slot or during different time slots because these spatial beams are not spatially adjacent. For example, the RRU 104D may transmit DL data across the spatial beams $D_2$ and $D_4$ during the same time slot so that UE 102B receives transmissions across spatial beams $A_2$, $B_2$, $C_2$, and $D_2$ at the same time and/or so that UE 102D receives transmissions across spatial beams $A_4$, $B_4$, and $D_4$ at the same time.

The spatial beams that form the active set for a particular UE 102A-102D may be used to transmit the same DL data to the UE 102A-102D at the same time. For example, the RRU 104A and the RRU 104C may transmit the same DL data to the UE 102A at the same time during the operational mode, with the RRU 104A transmitting the DL data over the spatial beam $A_1$ and the RRU 104C transmitting the DL data over the spatial beam $C_1$.

Once data is received by a UE 102A-102D across one or more spatial beams, the UE 102A-102D can non-coherently combine the received signals. As mentioned above, while the gain from non-coherently combining the received signals may not be as high as the gain from coherently combining the received signals, the difference in gain may be mitigated by the high throughput achieved by transmitting data at mmW frequencies. In addition, the RRUs 104A-104D can conserve network resources by reducing the amount of network overhead that would otherwise be involved to calibrate the RRUs 104A-104D allow coherent combining. However, in alternate embodiments, the UEs 102A-102D can combine the received signals by selecting the signal transmitted over the best spatial beam, by performing a soft combine of the received signals, and/or by performing a coherent combine of the received signals (which may involve RRU 104 calibration).

Optionally, one or more of the UEs 102A-102D can determine a link strength of a spatial beam over which DL data is transmitted to the respective UE 102A-102D. The UE(s) 102A-102D can supply the link strength to the RRUs 104A-104D in a manner as described above, the RRUs 104A-104D can share the link strengths with the BBU, and the BBU may use the link strengths to update the set of spatial beams included in a UE's 102A-102D active set. For example, the BBU may update a UE's 102A-102D active set if additional UEs 102 are introduced in the environment 100 and are now being served by spatially adjacent spatial beams, if channel conditions of a spatial beam change, etc. If an active set is updated, the RRUs 104A-104D may begin transmitting DL data to the UEs 102A-102D according to the updated active set.

Optionally, one or more of the UEs 102A-102D can periodically transmit uplink reference signals to the RRUs 104A-104D during the operational mode (e.g., as a result of an instruction or trigger by the RRU(s) 104A-104D to transmit the uplink reference signals). The UE(s) 102A-102D can supply the uplink reference signals to the RRUs 104A-104D in a manner as described above, the RRUs 104A-104D can share the uplink reference signals with the BBU, and the BBU may use the uplink reference signals (alone or in combination with other data, such as updated link strength data) to update the set of spatial beams included in a UE's 102A-102D active set. For example, the BBU may update a UE's 102A-102D active set if additional UEs 102 are introduced in the environment 100 and are now being served by spatially adjacent spatial beams, if channel conditions of a spatial beam change, etc. If an active set is updated, the RRUs 104A-104D may begin transmitting DL data to the UEs 102A-102D according to the updated active set.

In further embodiments, the BBU may schedule simultaneous transmissions over spatial beams serving different UEs 102A-102D accordingly to a scheduler metric. The scheduler metric may be a ratio of a link quality of a spatial beam selected to serve a particular UE 102A-102D to a ratio of leakage between the spatial beam selected to serve the particular UE 102A-102D and another spatial beam over which transmissions may be scheduled simultaneously with the spatial beam selected to serve the particular UE 102A-102D.

In further embodiments, the BBU can assign more than one digital baseband to a UE 102A-102D. The BBU may assign multiple digital basebands (and therefore more than one stream per RRU 104) to a UE 102A-102D in case more reliability is desired and/or strong secondary streams (e.g., strong secondary digital basebands) are available.

As illustrated in FIG. 2A, each RRU 104A-104D may not necessarily serve each UE 102A-102D. For example, an RRU 104A-104D may not serve a UE 102A-102D if the link strength and/or link quality from other RRUs 104A-104D is sufficient to serve the throughput specifications of the UE 102A-102D and/or network, and/or if one or more spatial beams originating from the RRU 104A-104D are not contributing much to the UE's 102A-102D link.

In further embodiments, the BBU can select spatial beams to include in a UE's 102A-102D active set and/or the spatial beams across which transmissions can be made simultaneously using a beam reception quality metric determined through receiving SSBs, channel state information-reference signals (CSI-RS), and/or similar DL reference signals from the UEs 102A-102D. Thus, the UEs 102A-102D can provide feedback on the quality of the spatial beams, and the BBU can accordingly select spatial beams to include in each UE's 102A-102D active set.

In further embodiments, the BBU can set active sets based on physical separation between reported best spatial beams. For example, if UE 102A reports that the best set of spatial beams is set S1 and UE 102B reports that the best set of spatial beams is set S2, the RRUs 104A-104D can simultaneously serve the UEs 102A and 102B as long as the sets S1 and S2 are physically separated by a threshold gap (e.g., a threshold distance, a threshold angle, etc.) that is sufficient to reduce and/or minimize interference.

Figure 3A:
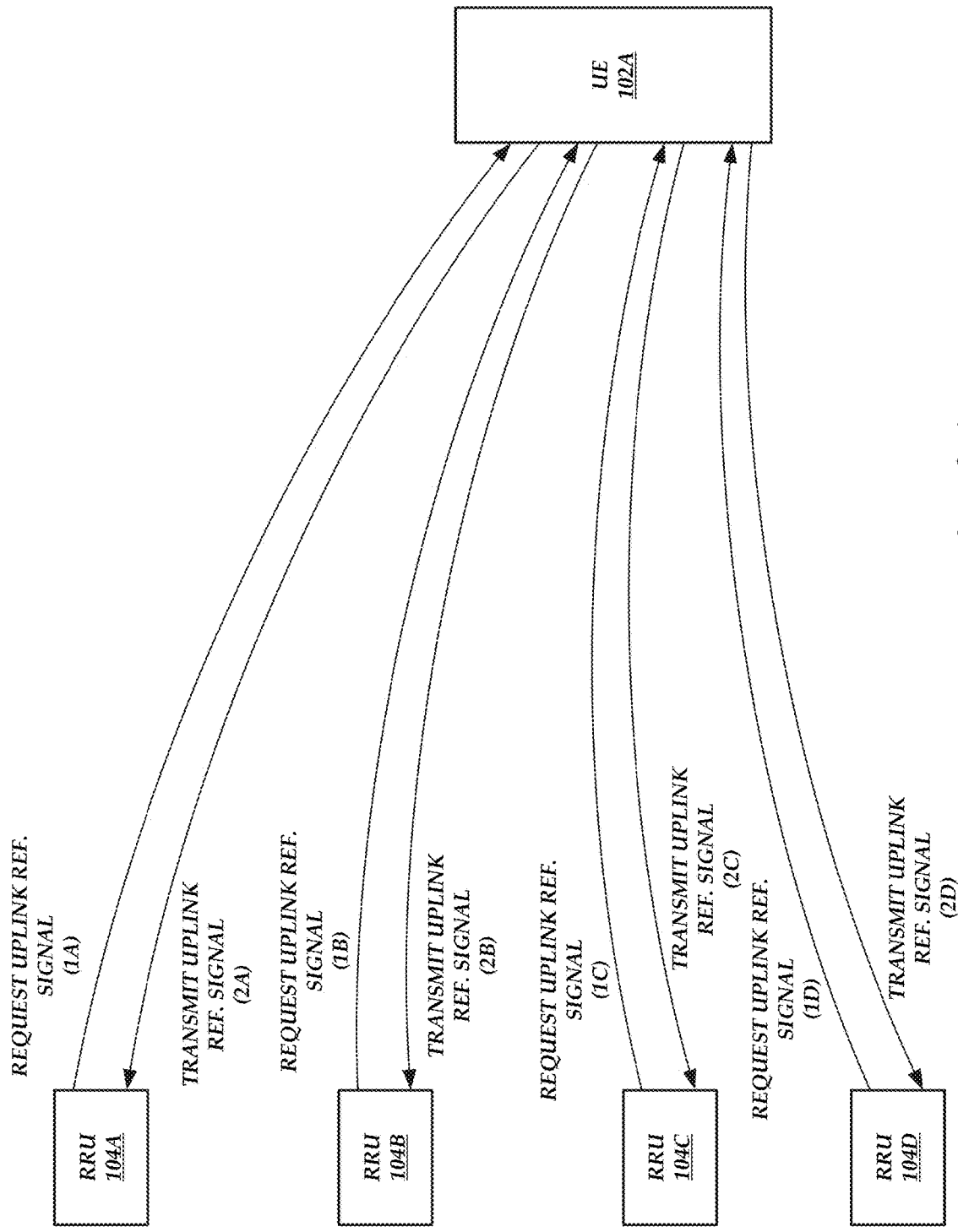
FIGS. 3A-3E are block diagrams of the environment of FIG. 1A illustrating the operations performed by the components of the environment of FIG. 1A to select active sets and transmit DL data according to an embodiment.

FIGS. 3A-3E are block diagrams of the environment 100 of FIG. 1A illustrating the operations performed by the components of the environment 100 to select active sets and transmit DL data according to an embodiment. As illustrated in FIG. 3A, the RRU 104A can transmit an uplink reference signal request to the UE 102A at (1A), the RRU 104B can transmit an uplink reference signal request to the UE 102A at (1B), the RRU 104C can transmit an uplink reference signal request to the UE 102A at (1C), and the RRU 104D can transmit an uplink reference signal request to the UE 102A at (1D). The RRUs 104A-104D may transmit the uplink reference signal requests sequentially, in parallel, and/or overlapping in time.

In response, the UE 102A can prepare and transmit an uplink reference signal to the RRU 104A at (2A), can prepare and transmit an uplink reference signal to the RRU 104B at (2B), can prepare and transmit an uplink reference signal to the RRU 104C at (2C), and can prepare and transmit an uplink reference signal to the RRU 104D at (2D). Alternatively, not shown, the UE 102A can transmit the uplink reference signals to a single RRU 104A-104D.

Figure 3B:
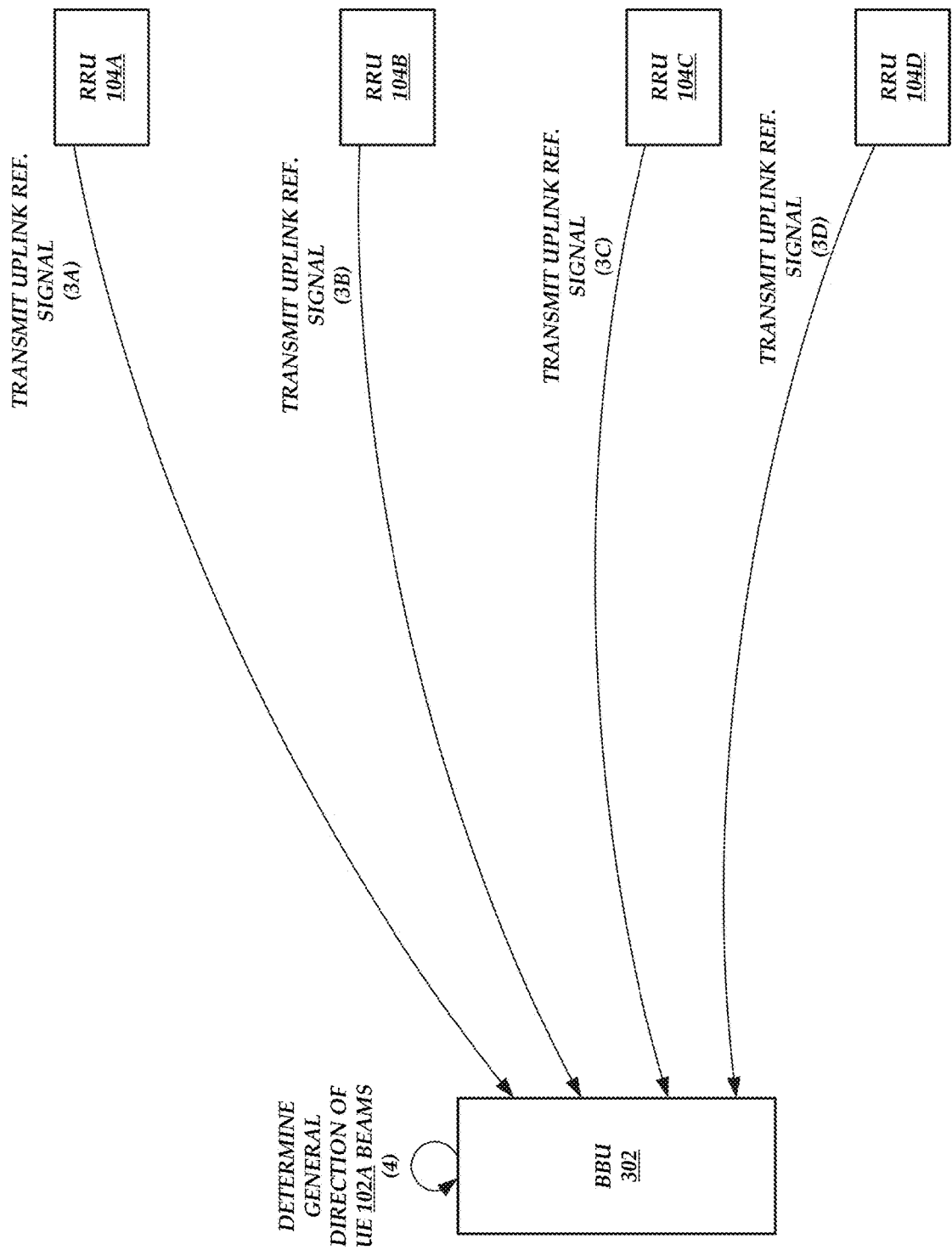

As illustrated in FIG. 3B, the RRU 104A can transmit the received uplink reference signal to BBU 302 at (3A), the RRU 104B can transmit the received uplink reference signal to the BBU 302 at (3B), the RRU 104C can transmit the received uplink reference signal to the BBU 302 at (3C), and the RRU 104C can transmit the received uplink reference signal to the BBU 302 at (3D). The BBU 302 can then process some or all of the uplink reference signals to determine a general direction of the UE 102A spatial beams at (4). For example, the BBU 302 can derive phase and amplitude measurements based on the uplink reference signal received by the antenna(s) of the RRUs 104A-104D and/or the spatial signatures of the antenna(s) that received the uplink reference signals. The BBU 302 can then determine a general spatial beam direction (e.g., a spatial beam pattern) for spatial beams that originate from the UE 102A.

Figure 3C:
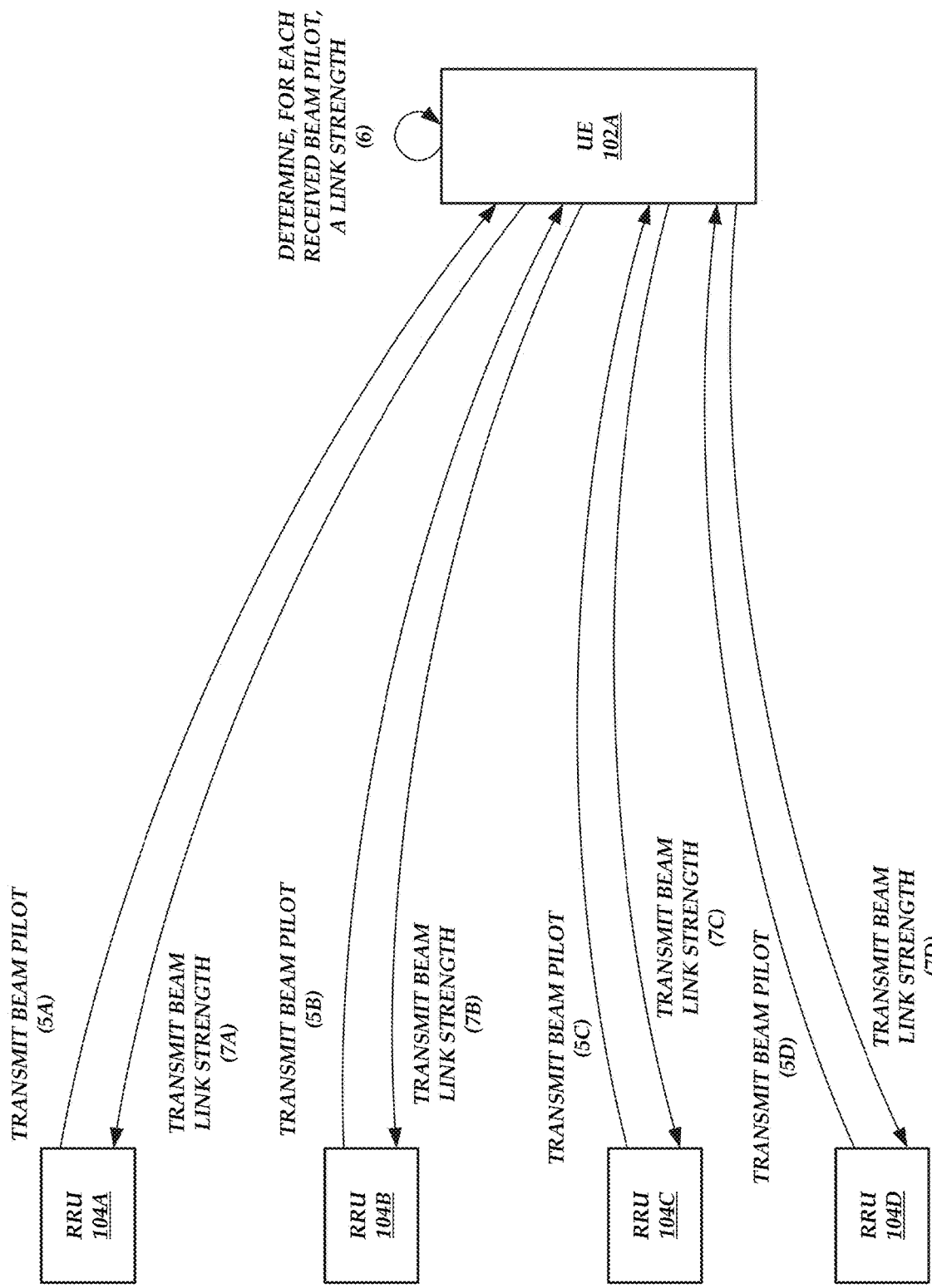

As illustrated in FIG. 3C, the RRU 104A can transmit a beam pilot to the UE 102A at (5A), the RRU 104B can transmit a beam pilot to the UE 102A at (5B), the RRU 104C can transmit a beam pilot to the UE 102A at (5C), and the RRU 104D can transmit a beam pilot to the UE 102A at (5D). The RRUs 104A-104D may transmit the beam pilots over different spatial beams sequentially. For example, the RRU 104A may transmit first, then the RRU 104B, then the RRU 104C, and then the RRU 104D. Accordingly, one RRU can transmit a beam pilot at a time. The RRUs 104A-104D can further transmit the beam pilots in a general direction that corresponds with the general spatial beam direction of spatial beams that originate from the UE 102A as determined by the BBU 302 (e.g., the BBU 302 can form the beam pilots, providing to the RRUs 104A-104D information on the direction or range of directions to which the beam pilots should be transmitted). For example, the RRUs 104A-104D can transmit the beam pilots in a direction or range of directions that encompasses the determined general spatial beam direction for the UE 102A and/or determined general spatial beam directions for other UEs 102B-102D.

For each received beam pilot, the UE 102A can determine at (6) a link strength of the spatial beam over which the respective beam pilot was transmitted. The link strength may be represented as an SINR. The UE 102A can then transmit the determined spatial beam link strength to the RRUs 104A-104D. For example, the UE 102A can transmit the RRU 104A spatial beam link strength to the RRU 104A at (7A), the UE 102A can transmit the RRU 104B spatial beam link strength to the RRU 104B at (7B), the UE 102A can transmit the RRU 104C spatial beam link strength to the RRU 104B at (7C), and the UE 102A can transmit the RRU 104D spatial beam link strength to the RRU 104B at (7D). Alternatively, not shown, the UE 102A can transmit the spatial beam link strengths to a single RRU 104A-104D.

Figure 3D:
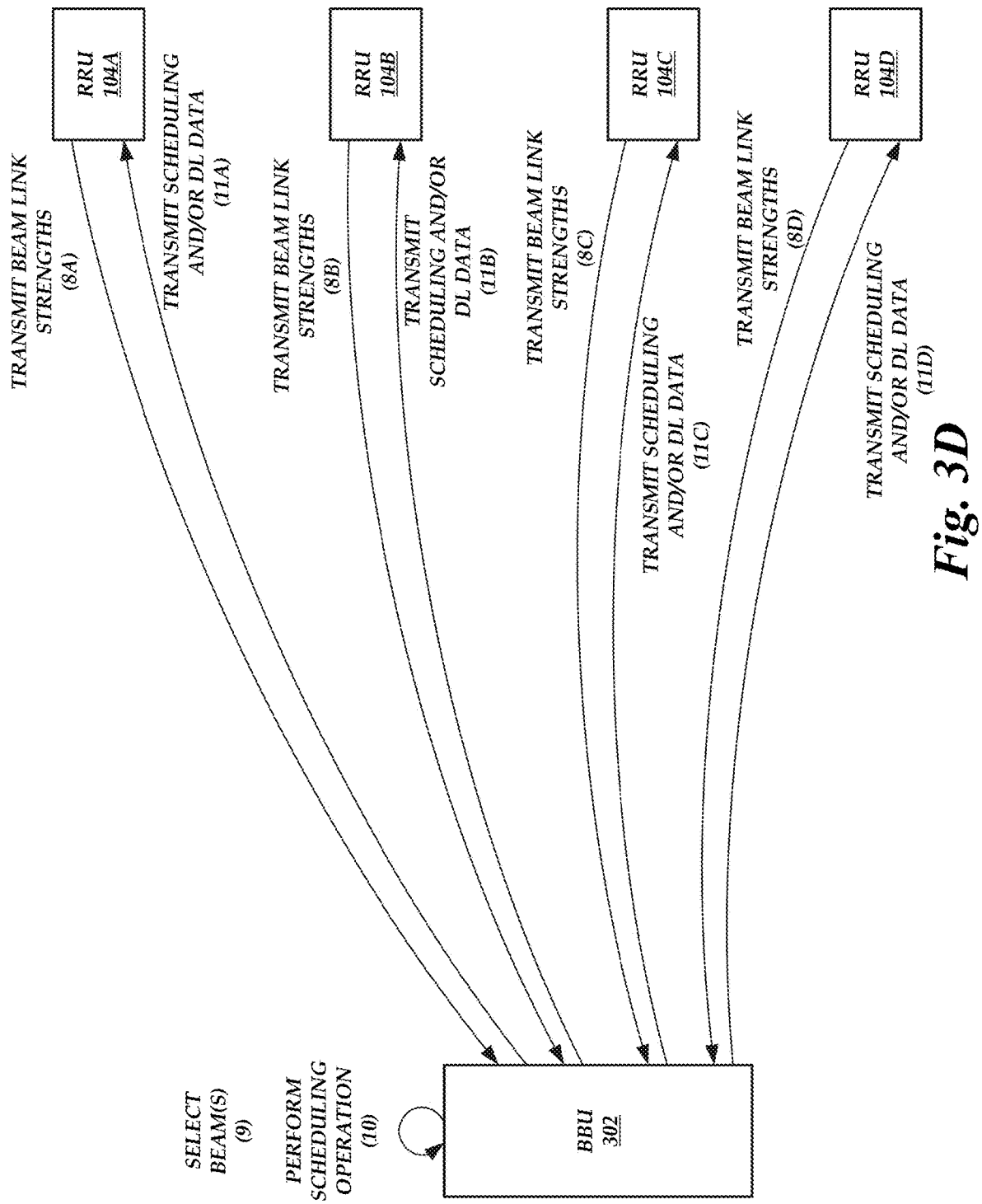

As illustrated in FIG. 3D, the RRUs 104A-104D forward the received spatial beam link strengths to BBU 302 at (8A), (8B), (8C), and (8D). The BBU 302 can select spatial beam(s) to serve the UE 102A at (9), and can perform a scheduling operation at (10). The BBU 302 can select spatial beam(s) to serve the UE 102A based on the provided spatial beam link strengths, link quality data, information indicating the physical location of and transmission direction of the RRU 104A-104D transmit antennas, a determined direction or range of directions from which spatial beams of the UE 102A originate (where the determination can be made by the BBU 302 and/or the RRUs 104A-104D based on a direction from which the spatial beam link strengths are transmitted by the UE 102A as detected by the RRUs 104A-104D and/or the BBU 302), uplink reference signals provided by the UE 102A, and/or information indicating which spatial beams have been selected to serve other UEs 102B-102D. The BBU 302 can perform the scheduling operation, including creating an active set for the UE 102A and determining when to transmit data to the UE 102A, once the spatial beam(s) to serve the UE 102A are selected.

The BBU 302 can then transmit, to the RRU 104A at (11A), scheduling data (e.g., DL data transmission timing and frequency data indicating when the RRU 104 should transmit DL data) and/or DL data for transmission to the UE 102A. Similarly, the BBU 302 can transmit scheduling data and/or DL data for transmission to the UE 102A to the node 102B at (11B), can transmit scheduling data and/or DL data for transmission to the UE 102A to the node 102C at (11C), and can transmit scheduling data and/or DL data for transmission to the UE 102A to the node 102D at (11D).

Figure 3E:
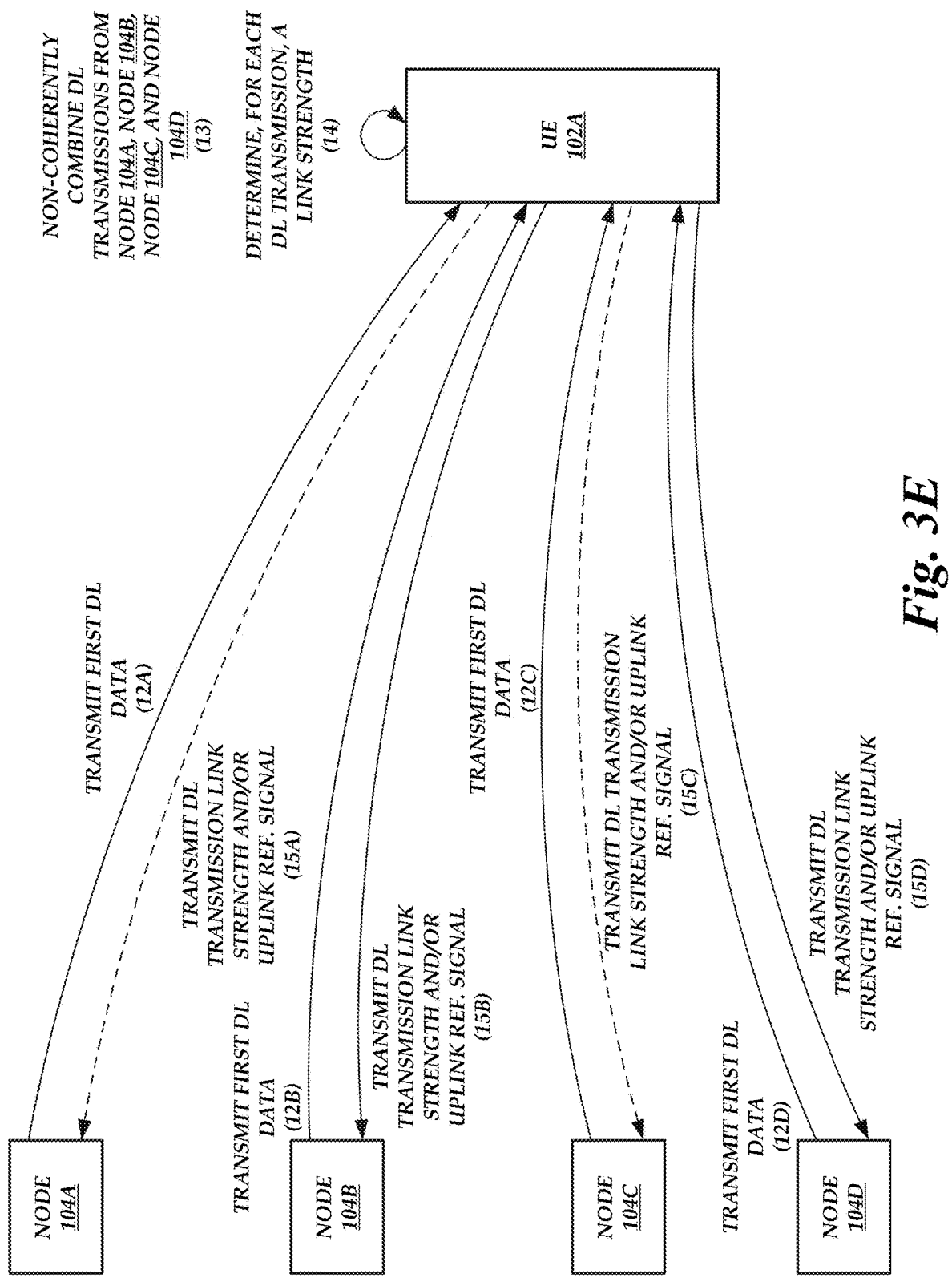

As illustrated in FIG. 3E, spatial beams provided by the RRU 104A, the RRU 104B, the RRU 104C, and the RRU 104D have been selected to serve the UE 102A. During an operational mode, the RRU 104A can transmit first DL data to the UE 102A across one spatial beam at (12A). At the same time (or at an overlapping or different time), the RRU 104B can transmit the same first DL data to the UE 102A across another spatial beam at (12B), the RRU 104C can transmit the same first DL data to the UE 102A across another spatial beam at (12C), and/or the RRU 104D can transmit the same first DL data to the UE 102A across another spatial beam at (12D). Thus, the RRUs 104A-104D can each transmit the same DL packet(s) to the UE 102A across one or more spatial beams. In further embodiments, the RRUs 104A-104D can each transmit the same DL packet(s) and/or different DL packet(s) to the UE 102A. The UE 102A can then non-coherently combine the DL transmissions from the RRU 104A, the RRU 104B, the RRU 104C, and the RRU 104D at (13).

Optionally, the UE 102A can determine, for each DL transmission, a link strength at (14). The UE 102A can then transmit the link strength data and/or a new or updated uplink reference signal to the RRU 104A at (15A), to the RRU 104B at (15B), to the RRU 104C at (15C), and/or to the RRU 104D at (15D). The RRUs 104A-104D may share the link strength data and/or the new or updated uplink reference signals with the BBU 302, and the BBU 302 may then use the link strength data and/or new or updated uplink reference signals to possibly update the active set of the UE 102A.

Figure 4:
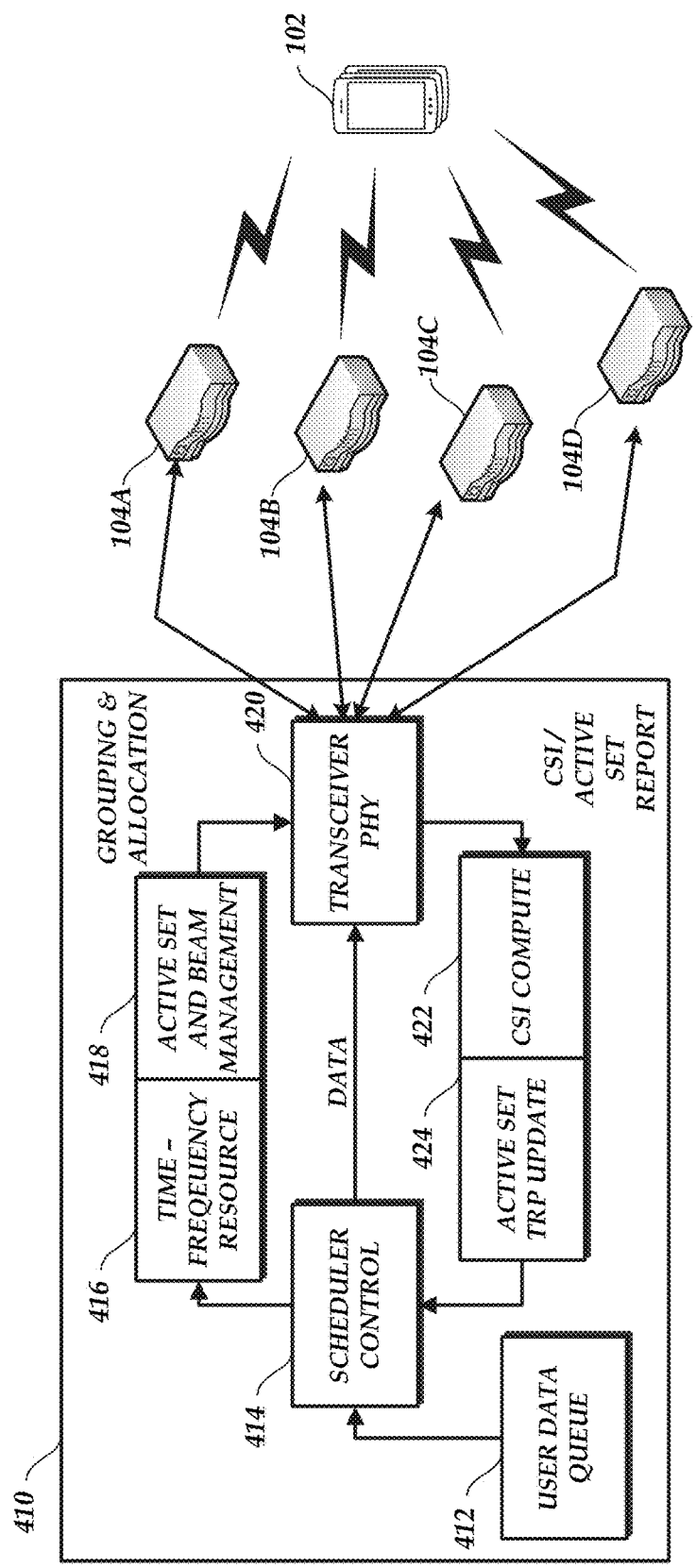
FIG. 4 is a schematic diagram illustrating a cooperative MIMO wireless network that includes a baseband unit according to an embodiment.

FIG. 4 is a schematic diagram illustrating a cooperative MIMO wireless network 400 that includes a baseband unit 410 according to an embodiment. In this embodiment, the RRUs 104A-104D may operate as serving nodes, and the baseband unit 410 may determine a direction or range of directions in which to transmit beam pilots to UEs 102A-102D, select spatial beam(s) to serve UEs 102A-102D, create active sets for the UEs 102A-104, and/or schedule data transmissions over the spatial beam(s) selected to serve the UEs 102A-102D based on data provided by the RRUs 104A-104D (e.g., link strength data, uplink reference signals, etc.).

As illustrated in FIG. 4, the baseband unit 410 includes a user data queue block 412, a scheduler control 414, a time/frequency resource allocation block 416, an active set and beam management block 418, a transceiver 420, a CSI computation block 422, and an active set serving node update block 424. The baseband unit 410 can include any suitable physical hardware to implement the illustrated blocks. For example, the baseband unit 410 can include a processor and computer readable storage to implement any suitable blocks shown in FIG. 4. The cooperative MIMO wireless network 400 also includes the RRUs 104A-104D and one or more UEs 102.

The baseband unit 410 includes a scheduler that schedules user data for wireless transmission from RRUs 104A-104D to UEs 102 over various spatial beams. The scheduler can determine a direction or range of directions in which to transmit beam pilots to UEs 102A-102D (e.g., based on uplink reference signals, link strength data transmissions, and/or acknowledgment or no acknowledgment messages provided by the UEs 102A-102D, in a manner as described herein), select spatial beam(s) to serve UEs (e.g., based on link strength data provided by the UEs 102A-102D, uplink reference signals provided by the UEs 102A-102D, etc., in a manner as described herein), can create active sets for the UEs, can schedule DL data traffic for simultaneous transmission to multiple UEs, and/or can schedule DL data traffic in a time division multiplexed fashion such that DL data traffic is transmitted to one UE 102 during a first time slot and is transmitted to a second UE 102 during a second time slot after (or before) the first time slot. The RRUs 104A-104D can alternatively be referred to as transmission points for DL data transmission. The scheduler can schedule data from any suitable number of RRUs 104A-104D to any suitable number of UE 102. The scheduler can include the user data queue block 412, the scheduler control 414, the time/frequency resource allocation block 416, the active set and beam management block 418, the CSI computation block 422, and the active set serving node update block 424.

The transceiver 420 can provide a UE report from the UE 102 to the scheduler. For example, the UE report can include spatial beam link strengths, spatial beam link quality, uplink reference signals, and/or other CSI suitable for allowing the scheduler to select spatial beam(s) to serve the UEs 102, create active sets for the UEs 102, and/or schedule DL data transmissions. The CSI computation block 422 can compute CSI data from data in the UE report. The active set serving node update block 424 can determine an updated active set for one or more UEs 102 based on updated link strength information and/or new or updated uplink reference signals provided by the UE(s) 102 (e.g., provided by the UE(s) 102 in response to receiving DL data traffic, as described above). In some instances, the active set serving node update block 424 can determine an updated active set for a subset of one or more antennas of a UE 102. The active set serving node update block 424 can use any suitable metrics disclosed herein to update an active set associated with a UE 102.

The updated active set data is provided to the scheduler control 414. The user data queue block 412 can provide user data to the scheduler control 414, including DL data, beam pilot data, uplink reference signal transmission instructions, and/or the like. The scheduler control 414 provides user data to the transceiver 420 and also provides instructions to the time/frequency resource allocation block 416. The time/frequency resource allocation block 416 can schedule timing and frequency of DL data transmission from RRUs 104A-104D (e.g., generate scheduling data), which can be forwarded to the RRUs 104A-104D via the transceiver 420. This can avoid timing conflicts and conflicts in the frequency domain. The active set and beam management block 418 can select RRUs 104A-104D and/or specific spatial beams offered by these RRUs 104A-104D for providing wireless transmission services to UEs 102, and create corresponding active sets for the UEs 102 in a manner as described herein. The active set and beam management block 418 can also determine a direction or range of directions in which the user data is to be transmitted. For example, the active set and beam management block 418 can process uplink reference signals and/or RRU 104A-104D antenna spatial signatures to determine phase(s) and/or amplitude(s), and use the phase(s) and/or amplitude(s) to determine a general spatial direction (e.g., a general beam pattern) for spatial beams originating from a UE 102A-102D. Based on the determined general spatial direction, the active set and beam management block 418 can determine a direction or range of directions in which beam pilots should be transmitted to the UEs 102A-102D in a training mode (e.g., the direction or range of directions may encompass and/or be within an N degree angle of a determined general spatial direction for spatial beams originating from at least one of the UEs 102A-102D). The active set and beam management block 418 can further determine a direction or range of directions for DL data to be transmitted to the UEs 102A-102D from the uplink reference signals, messages from the UEs 102A-102D sent in response to beam pilots that include link strength data, and/or the like. The active set and beam management block 418 can group DL data transmissions and manage beamforming from the RRUs 104A-104D to the UEs 102. The transceiver 420 provides data for transmission by the RRUs 104A-104D to UEs 102.

As illustrated in FIG. 4, the scheduler can cause a network system of the cooperative MIMO wireless network 400 to wirelessly transmit first user data to a first UE 102 across one or more spatial beams, to transmit second user data to a second UE 102 across one or more spatial beams, and so on. The scheduler can cause the transmissions of the first user data, the second user data, etc. to occur simultaneously and/or at different times. Moreover, the scheduler can cause a network system of the cooperative MIMO wireless network 400 to wirelessly transmit user data to any suitable number of UEs 102 across one or more spatial beams served by one or more RRUs 104A-104D.

Figure 5:
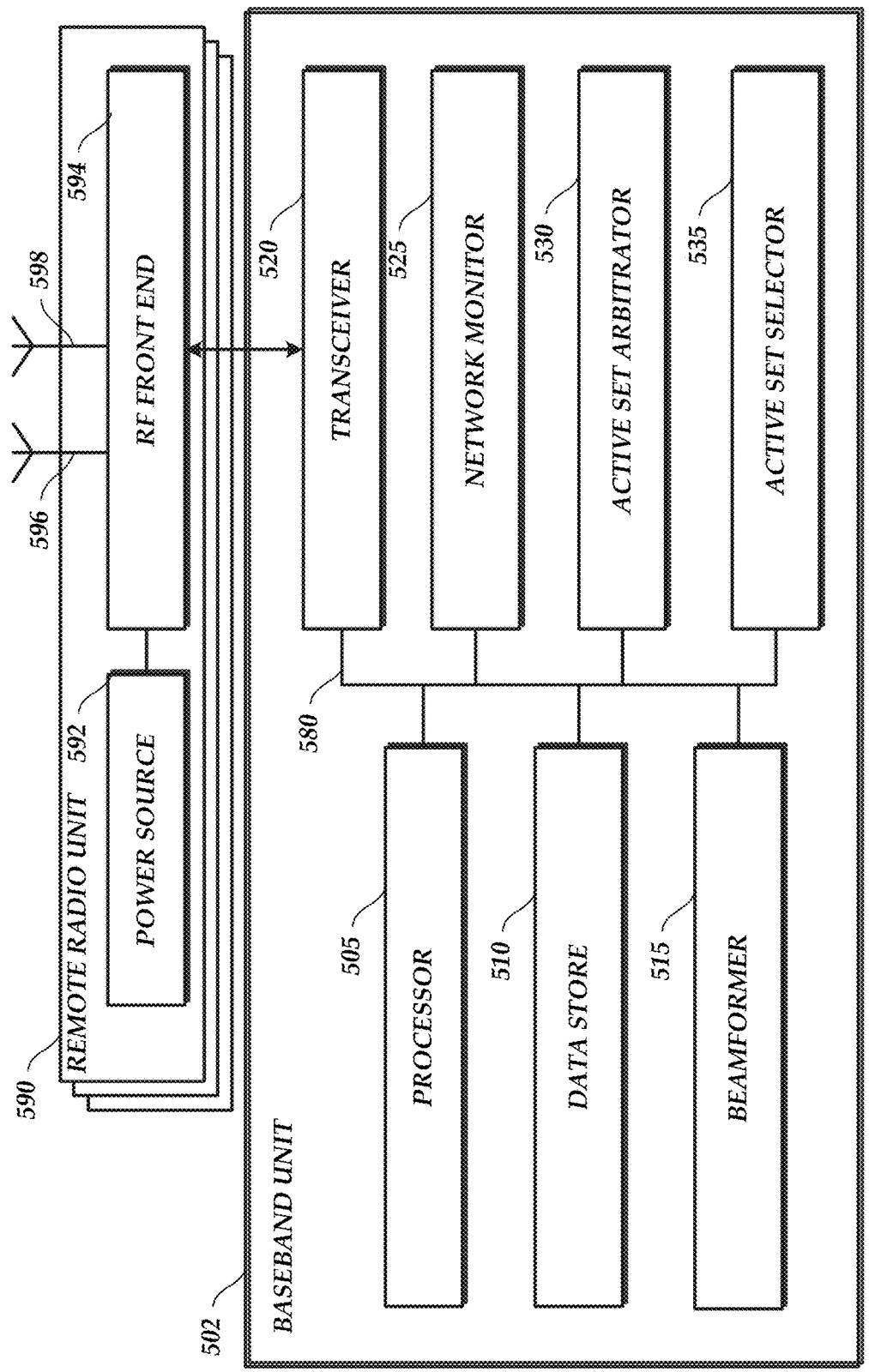
FIG. 5 is a block diagram illustrating an example baseband unit and remote radio unit according to an embodiment.

FIG. 5 is a block diagram illustrating an example baseband unit and remote radio unit according to an embodiment. The baseband unit 502 may be coupled with at least one remote radio unit 590. The remote radio unit 590 may include at least a first antenna 596 and a second antenna 598 for MIMO wireless communications. Any antenna disclosed herein, such as the antenna 596 or the antenna 598, can be referred to as antenna element. The first antenna 596 and the second antenna 598 may be coupled with a radio frequency (RF) front end 594. The RF front end 594 may process signals received via the first antenna 596 and the second antenna 598. Part of processing a signal may include transmitting the signal to a transceiver 520 included in the BBU 502.

A processor 505 may receive signals received by the transceiver 520. The processor 505 may be configured to determine a type of the signal. For example, if the signal includes a request for connection services, the processor 505 may provide the signal to an active set selector 535. The active set selector 535 may be configured to identify an active set of serving nodes to provide the requested downlink data transmission service. The active set selector 535 can identify the active set for a UE based on information associated with the UE. Alternatively or additionally, the active set selector 535 can identify the active set for a UE based on information associated with one or more other UEs. In some instances, the active set selector 535 can identify specific spatial beam(s) selected to serve a UE. The BBU 502 may include a network monitor 525 to detect characteristics of the network such as the number of UEs served by each RRU 590, network data transmission load, and/or the like. The active set selector 535 may receive the network characteristics from the network monitor 525 as a factor considered when selecting spatial beam(s) to serve a UE and/or identifying an active set for a UE.

A beamformer 515 may be included in the BBU 502 to further identify parameters for the serving nodes (e.g., RRUs 590) included in an active set. The parameters may include one or more of transmission mode, time, frequency, power, beamforming matrix, tone allocation, or channel rank. The beamformer 515 may determine optimal parameters for RRUs 590 coupled with the BBU 502 that facilitate a network-wide optimization of downlink data transmissions. In some implementations, the active set selector 535 determines an active set for a UE based, in part, on information provided by the UE. In other implementations, a UE may provide a requested active set. The BBU 502 may include an active set arbitrator 530 to reconcile a requested active set with an active set selected by the active set selector 535. The active set arbitrator 530 may compare a requested set of serving nodes to the serving nodes identified by the active set selector 535. The comparison may include ordering the serving nodes according to the UE recommendation. In some implementations, the active set arbitrator 530 may provide a message to the UE indicating confirmation or other assessment for a requested active set. For example, if the UE requested nodes A and B but the BBU 502 identified only B in the active set, the message may include a code indicating a partial match for the active set. Other status codes may be included to facilitate efficient communication and assessment of requested active sets. The active set arbitrator 530 may additionally or alternatively compare a requested transmission mode to the transmission mode identified by the active set selector 535 or other element of the BBU 502.

The BBU 502 may include a data store 510. The data store 510 may include instructions that can be executed by the processor 505 to implement the features described herein. In some implementations, the data store 510 may retain active sets or other scheduling information assigned to UEs served by the BBU 502. The data store 510 may be indexed by UE identifier and/or RRU identifier. This can expedite identification of previously communicated scheduling information for the UE and for monitoring network conditions (e.g., number of UEs allocated to an RRU 590 or antenna element of an RRU 590).

In addition to providing the scheduling information to the UE, the scheduling information may be used to configure the RRU 590. The configuration may include adjusting the first antenna 596 such as by frequency modulation, time modulation, altering transmission power from a power source 592, or adjusting direction, tone allocation, or beamforming of the transmission.

As discussed above, a variety of different UEs can wirelessly communicate with serving nodes in a cooperative MIMO network. An example UE will be discussed with reference to FIG. 6.

Figure 6:
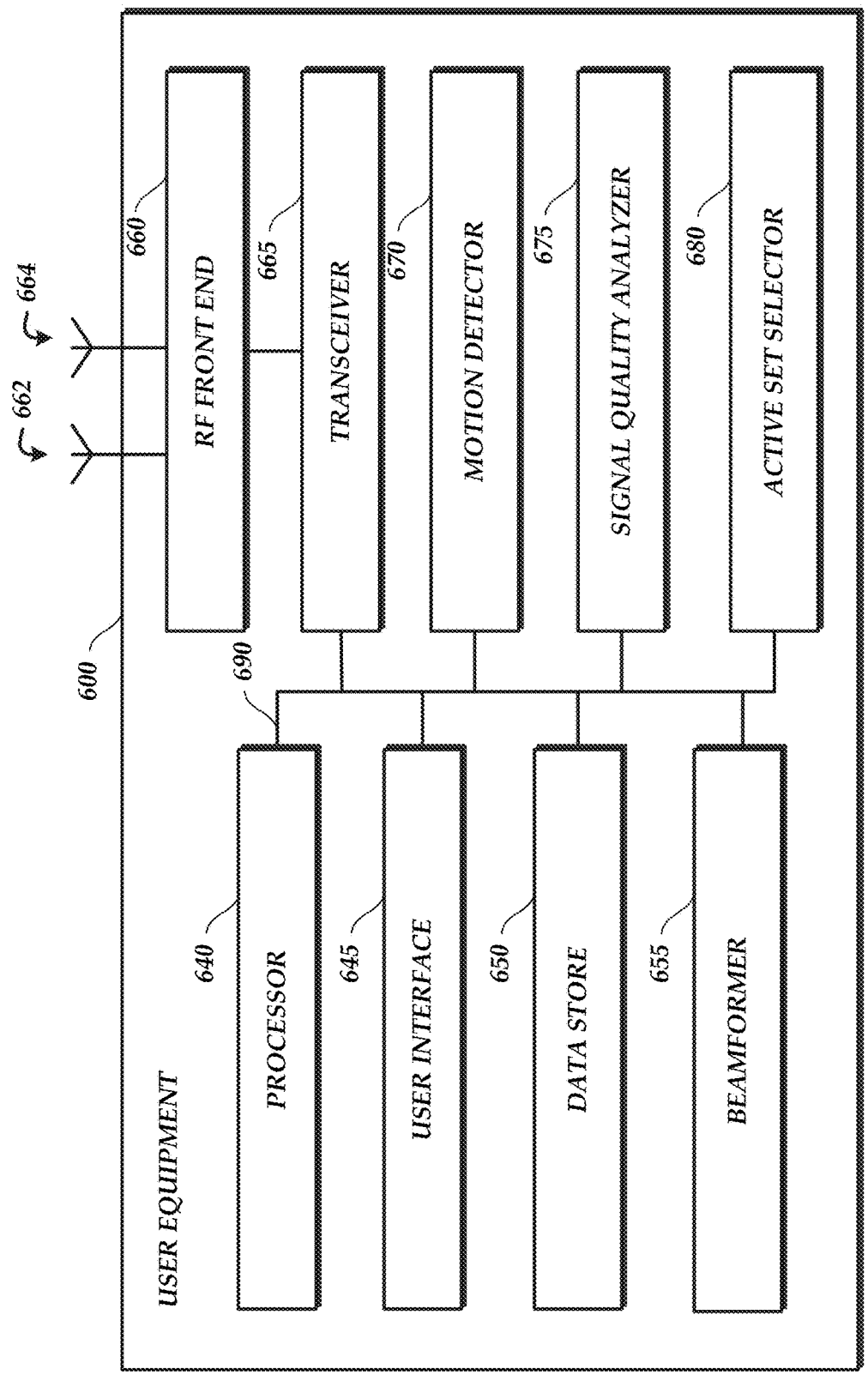
FIG. 6 is a schematic block diagram of an example UE according to an embodiment.

FIG. 6 is a schematic block diagram of an example UE 600 according to an embodiment. The UE 600 is configured for wirelessly communicating with a base station in a cooperative MIMO network. As illustrated in FIG. 6, the UE 600 includes a processor 640, a user interface 645, a data store 650, a beamformer 655, antennas 662 and 664, a transceiver 665, a motion detector 670, a signal quality analyzer 675, and an active set selector 680. Some other UEs can include additional elements and/or a subset of the elements illustrated in FIG. 6.

The UE 600 includes a plurality of antennas 662 and 664. Any suitable number of antennas can be included for wireless communication. The UE 600 can include one or more arrays of antennas. A radio frequency (RF) front end 660 can process RF signals received via the antennas 662 and 664. The RF front end can also provide RF signals to the antennas 662 and 664 for transmission. The transceiver 665 includes a transmitter and a receiver. The transceiver 665 can provide processing for transmitting and receiving RF signals associated with the antennas 662 and 664. For example, upon receiving active set data, the processor 640 can configure the transceiver 665 (e.g., receiver) to receive DL data associated with the spatial beam(s) identified in the active set data as being selected to serve the UE 600.

The processor 640 is in communication with the transceiver 665. The processor 640 is implemented by physical hardware arranged to perform specific operations to implement functionality related to determining a link strength of spatial beams over which beam pilots and/or user data are transmitted. The processor 640 can determine the link strength, identify a spatial beam that provides the best link strength, and/or generate one or more messages to report the link strength and/or an uplink reference signal to a serving node in accordance with any suitable principles and advantages disclosed herein. The processor 640 can cause active set and neighbor set data to be stored and updated. The processor 640 can perform any other suitable processing for the UE 600.

The processor 640 can be in communication with the motion detector 670 and the signal quality analyzer 675. Accordingly, the processor 640 can receive and process information associated with conditions of the UE 600. The motion detector 670 can include any suitable hardware arranged to detect mobility information associated with the UE 600. The signal quality analyzer 675 can analyze the quality of signals received and/or transmitted by the antennas 662 and 664. This can provide information associated with a spatial channel condition of the UE 600. The information associated with conditions of the UE 600 can be provided to the processor 640 for providing to the serving node(s). In some instances, some or all of the functionality of the motion detector 670 and/or the signal quality analyzer can be implemented by the processor 640.

The active set selector 680 is optional and can identify a desired active set of one or more serving nodes. The active set selector 680 can select the desired active set based on data associated with one or more of: one or more serving nodes in the active set, one or more serving nodes in the neighbor set, mobility data associated with the UE 600, a spatial channel condition associated with the UE 600, the link strength and/or the link quality of one or more spatial beams served by one or more serving nodes, or one or more characteristics of the UE 600. The active set selector 680 can cause the processor 640 to generate a message for transmission to a serving node and/or a BBU to request that a selected spatial beam (or selected spatial beams) be added to an active set for the UE 600 (e.g., request that a selected spatial beam, which may be different than the spatial beam(s) already included in an active set for the UE 600, be included in an updated active set for the UE 600). The active set selector 680 can be implemented by dedicated circuitry and/or circuitry of the processor 640.

The beamformer 655 can perform any suitable beamforming functionality for the UE 600. The beamformer 655 can set and/or adjust one or more parameters associated with receiving and/or transmitting signals associated with the antennas 662 and 664 of the UE 600. The beamformer 655 can be implemented by dedicated circuitry and/or circuitry of the processor 640.

The UE 640 includes a data store 650. The data store 650 can store instructions that can be executed by the processor 640 to implement the features described herein. The data store 650 can store active set data and neighbor set data for the UE 600. The data store 650 can store spatial beam link strengths and/or link qualities. The data store 650 can store any other suitable data for the UE 600. The data store 650 can include any suitable memory elements arranged to store data.

Several elements included in the UE 600 may be coupled by a bus 690. The bus 690 can be a data bus, communication bus, other bus, or any suitable combination thereof to enable the various components of the UE 600 to exchange information.

As illustrated in FIG. 6, the UE 600 also includes a user interface 645. The user interface 645 can be any suitable user interface, such as a display and/or an audio component. In some instances, the user interface 645 can include one or more of touch screen capabilities, a button, a knob, a switch, or a slider.

Figure 7:
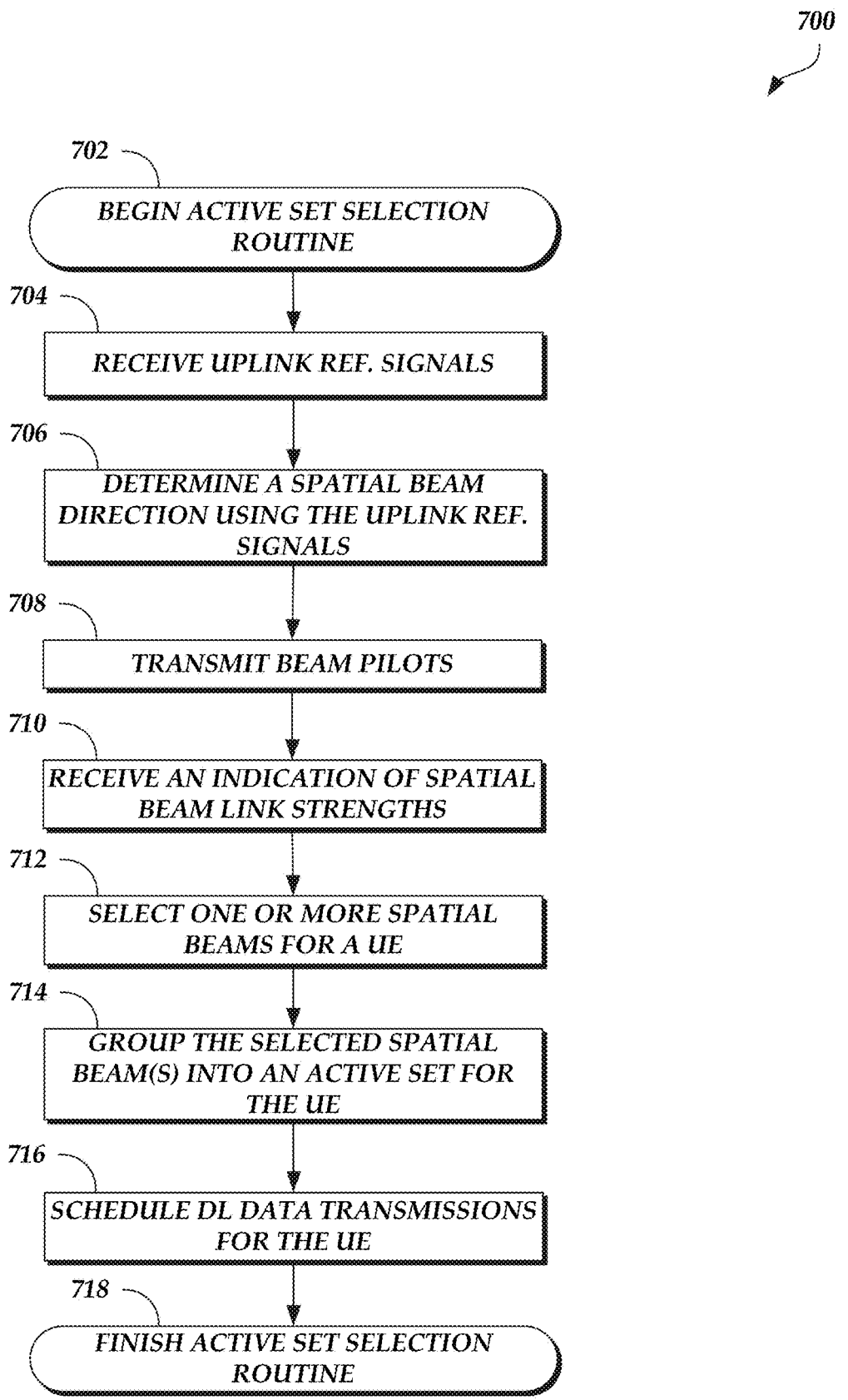
FIG. 7 is a flow diagram depicting an active set selection routine illustratively implemented by a node and/or a BBU, according to one embodiment.

FIG. 7 is a flow diagram depicting an active set selection routine 700 illustratively implemented by a node and/or a BBU, according to one embodiment. As an example, an RRU 104A-104D of FIG. 1A and/or a BBU, such as the BBU 302 of FIG. 3B, the BBU 410 of FIG. 4, and/or the BBU 502 of FIG. 5, can be configured to execute the active set selection routine 700. The active set selection routine 700 begins at block 702.

At block 704, uplink reference signals are received. For example, the uplink reference signals can be received from one or more UEs 102A-102D periodically. The uplink reference signals can include SRS data and/or DMRS data.

At block 706, a spatial beam direction is determined using the uplink reference signals. For example, a general direction (e.g., a 5 degree angle, a 10 degree angle, a 15 degree angle, etc. in a three-dimensional space) from which spatial beams originating from a UE 102A-102D can be identified using the uplink reference signals and/or spatial signatures of the antennas that receive uplink reference signals from the UE 102A-102D. The uplink reference signals can be received and the spatial beam direction can be determined during a training mode (e.g., prior to selection of an active set for a UE 102A-102D) or during an operational mode (e.g., after an initial selection of an active set for a UE 102A-102D).

At block 708, beam pilots are transmitted. The beam pilots may be transmitted across multiple spatial beams and be received by a UE. The beam pilots may be transmitted in accordance with the determined spatial beam direction. For example, the beam pilots may be transmitted over a fine area that encompasses at least a portion of the determined spatial beam direction.

At block 710, an indication of spatial beam link strengths is received. For example, the UE may provide an indication of the link strength of each spatial beam based on the transmitted beam pilots.

At block 712, one or more spatial beams are selected for the UE. The spatial beam(s) selected for the UE may be based on the received link strengths, received link qualities, information associated with the physical layout and/or transmission direction of various transmit antennas, and/or information identifying spatial beams selected to serve other UEs.

At block 714, the selected spatial beam(s) are grouped into an active set for the UE. The active set may identify pairs of serving nodes and spatial beams that form the active set for the UE.

At block 716, DL data transmissions for the UE are scheduled. DL data may be transmitted to the UE across the spatial beam(s) included in the UE's active set simultaneously with other transmissions to other UEs and/or at different times from transmissions to other UEs. After scheduling DL data transmissions for the UE, the active set selection routine 700 is complete, as shown at block 718.

TERMINOLOGY, APPLICATIONS, AND CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network system operating in a millimeter wave frequency band, the network system comprising:
    a first serving node comprising a first plurality of antenna elements, the first serving node configured to transmit first beam pilots via the first plurality of antenna elements across a first plurality of spatial beams and receive, from one or more user equipment (UEs), link strength data associated with the first plurality of spatial beams in response to the transmission;
    a second serving node comprising a second plurality of antenna elements, the second serving node configured to transmit second beam pilots via the second plurality of antenna elements across a second plurality of spatial beams and receive, from the one or more UEs, link strength data associated with the second plurality of spatial beams in response to the transmission; and
    a baseband unit scheduler in communication with the first and second serving nodes, the baseband unit scheduler comprising a processor and computer-executable instructions, wherein the computer-executable instructions, when executed by the processor, cause the baseband unit scheduler to:
        select, based on the link strength data associated with the first plurality of spatial beams and the link strength data associated with the second plurality of spatial beams, at least one spatial beam in the first plurality of spatial beams across which the first serving node transmits and at least one spatial beam in the second plurality of spatial beams across which the second serving node transmits to serve a first UE in the one or more UEs;
        generate an active set for the first UE that identifies the selected spatial beams; and
        cause transmission of downlink data to the first UE across the selected spatial beams identified in the active set.

2. The network system of claim 1, wherein the computer-executable instructions, when executed, further cause the baseband unit scheduler to:
    cause transmission of a packet to the first UE across the at least one spatial beam in the first plurality of spatial beams; and
    cause transmission of the same packet to the first UE across the at least one spatial beam in the second plurality of spatial beams.

3. The network system of claim 1, wherein the computer-executable instructions, when executed, further cause the baseband unit scheduler to select the at least one spatial beam in the first plurality of spatial beams and the at least one spatial beam in the second plurality of spatial beams to serve the first UE based on information indicating spatial beams used to serve at least one UE in the one or more UEs that is different from the first UE.

4. The network system of claim 1, wherein the first serving node is configured to receive uplink reference signals via at least one of the first plurality of antenna elements across at least one of the first plurality of spatial beams, and wherein the second serving node is configured to receive second uplink reference signals via at least one of the second plurality of antenna elements across at least one of the second plurality of spatial beams.

5. The network system of claim 4, wherein the computer-executable instructions, when executed, further cause the baseband unit scheduler to determine a range of directions from which spatial beams of the first UE originate using at least one of the uplink reference signals or the second uplink reference signals.

6. The network system of claim 5, wherein the first serving node is further configured to transmit the first beam pilots via the first plurality of antenna elements across the first plurality of spatial beams in a direction corresponding to the determine range of directions.

7. The network system of claim 5, wherein the second serving node is further configured to transmit the second beam pilots via the second plurality of antenna elements across the second plurality of spatial beams in a direction corresponding to the determine range of directions.

8. The network system of claim 4, wherein the computer-executable instructions, when executed, further cause the baseband unit scheduler to determine a range of directions from which spatial beams of the first UE originate using the uplink reference signals and spatial signatures of each of the first plurality of antenna elements that receive the uplink reference signals.

9. The network system of claim 4, wherein the uplink reference signals comprise at least one of sounding reference signals or demodulation reference signals.

10. The network system of claim 4, wherein the computer-executable instructions, when executed, further cause the baseband unit scheduler to select, based on the link strength data associated with the first plurality of spatial beams, the link strength data associated with the second plurality of spatial beams, and the uplink reference signals, at least one spatial beam in the first plurality of spatial beams and at least one spatial beam in the second plurality of spatial beams to serve the first UE.

11. The network system of claim 1, wherein the selected spatial beams comprises a first spatial beam in the first plurality of spatial beams and a second spatial beam in the second plurality of spatial beams.

12. The network system of claim 11, wherein the first serving node is further configured to transmit the downlink data to the first UE via a first antenna element in the first plurality of antenna elements across the first spatial beam.

13. The network system of claim 12, wherein the first serving node is further configured to receive a no acknowledgment message from the first UE in response to transmission of the downlink data to the first UE via the first antenna element across the first spatial beam.

14. The network system of claim 13, wherein the first serving node is further configured to re-transmit the downlink data to the first UE via the first antenna element across the first spatial beam in response to receipt of the no acknowledgment message.

15. The network system of claim 13, wherein the second serving node is further configured to transmit the downlink data to the first UE via a second antenna element in the second plurality of antenna elements across the second spatial beam in response to receipt of the no acknowledgment message.

16. The network system of claim 13, wherein at least one of the first serving node is configured to re-transmit the downlink data to the first UE via the first antenna element across the first spatial beam or the second serving node is configured to transmit the downlink data to the first UE via a second antenna element in the second plurality of antenna elements across the second spatial beam in response to receipt of the no acknowledgment message.

17. The network system of claim 1, wherein the millimeter wave frequency band comprises a frequency range between 24 GHz and 300 GHz.

18. A computer-implemented method comprising:
causing a first serving node comprising a first plurality of antenna elements to transmit first beam pilots via the first plurality of antenna elements across a first plurality of spatial beams, wherein the first serving node is configured to receive, from one or more user equipment (UEs), link strength data associated with the first plurality of spatial beams in response to the transmission;
causing a second serving node comprising a second plurality of antenna elements to transmit second beam pilots via the second plurality of antenna elements across a second plurality of spatial beams, wherein the second serving node is configured to receive, from the one or more UEs, link strength data associated with the second plurality of spatial beams in response to the transmission;
selecting, based on the link strength data associated with the first plurality of spatial beams and the link strength data associated with the second plurality of spatial beams, at least one spatial beam in the first plurality of spatial beams across which the first serving node transmits and at least one spatial beam in the second plurality of spatial beams across which the second serving node transmits to serve a first UE in the one or more UEs;
generating an active set for the first UE that identifies the selected spatial beams; and
causing transmission of downlink data to the first UE across the selected spatial beams identified in the active set.

19. The computer-implemented method of claim 18, wherein the first serving node is configured to receive uplink reference signals via at least one of the first plurality of antenna elements across at least one of the first plurality of spatial beams, and wherein the second serving node is configured to receive second uplink reference signals via at least one of the second plurality of antenna elements across at least one of the second plurality of spatial beams.

20. The computer-implemented method of claim 19, further comprising determining a range of directions from which spatial beams of the first UE originate using at least one of the uplink reference signals or the second uplink reference signals.

21. The computer-implemented method of claim 20, wherein the first serving node is further configured to transmit the first beam pilots via the first plurality of antenna elements across the first plurality of spatial beams in a direction corresponding to the determine range of directions.

22. The computer-implemented method of claim 19, wherein the uplink reference signals comprise at least one of sounding reference signals or demodulation reference signals.

23. Non-transitory, computer-readable storage media comprising computer-executable instructions, wherein the computer-executable instructions, when executed by a scheduler in a baseband unit, cause the baseband unit to:
cause a first serving node comprising a first plurality of antenna elements to transmit first beam pilots via the first plurality of antenna elements across a first plurality of spatial beams, wherein the first serving node is configured to receive, from one or more user equipment (UEs), link strength data associated with the first plurality of spatial beams in response to the transmission;
cause a second serving node comprising a second plurality of antenna elements to transmit second beam pilots via the second plurality of antenna elements across a second plurality of spatial beams, wherein the second serving node is configured to receive, from the one or more UEs, link strength data associated with the second plurality of spatial beams in response to the transmission, wherein the first serving node is configured to receive uplink reference signals via at least one of the first plurality of antenna elements across at least one of the first plurality of spatial beams, and wherein the second serving node is configured to receive second uplink reference signals via at least one of the second plurality of antenna elements across at least one of the second plurality of spatial beams;
determine a range of directions from which spatial beams of a first UE in the one or more UEs originate using at least one of the uplink reference signals or the second uplink reference signals;
select, based on the link strength data associated with the first plurality of spatial beams and the link strength data associated with the second plurality of spatial beams, at least one spatial beam in the first plurality of spatial beams and at least one spatial beam in the second plurality of spatial beams to serve the first UE;
generate an active set for the first UE that identifies the selected spatial beams; and
cause transmission of downlink data to the first UE across the selected spatial beams identified in the active set.

* * * * *